US011906968B2

(12) United States Patent
Sakurai

(10) Patent No.: US 11,906,968 B2
(45) Date of Patent: Feb. 20, 2024

(54) MOBILE DEVICE, MOBILE DEVICE CONTROL SYSTEM, METHOD, AND PROGRAM

(71) Applicant: Sony Group Corporation, Tokyo (JP)

(72) Inventor: Tatsuma Sakurai, Tokyo (JP)

(73) Assignee: Sony Group Corporation, Tokyo (JP)

(*) Notice: Subject to any disclaimer, the term of this patent is extended or adjusted under 35 U.S.C. 154(b) by 395 days.

(21) Appl. No.: 17/267,329

(22) PCT Filed: Aug. 16, 2019

(86) PCT No.: PCT/JP2019/032120
§ 371 (c)(1),
(2) Date: Feb. 9, 2021

(87) PCT Pub. No.: WO2020/049978
PCT Pub. Date: Mar. 12, 2020

(65) Prior Publication Data
US 2021/0240189 A1 Aug. 5, 2021

(30) Foreign Application Priority Data
Sep. 5, 2018 (JP) .................................. 2018-165725

(51) Int. Cl.
*G05D 1/02* (2020.01)
*G05D 1/00* (2006.01)
(Continued)

(52) U.S. Cl.
CPC .......... *G05D 1/0214* (2013.01); *G01C 21/206* (2013.01); *G05D 1/0088* (2013.01);
(Continued)

(58) Field of Classification Search
CPC .. G05D 1/0214; G05D 1/0088; G05D 1/0223; G05D 1/0231; G05D 2201/0211;
(Continued)

(56) References Cited

U.S. PATENT DOCUMENTS 6,760,647 B2 * 7/2004 Nourbakhsh ........ G05D 1/0214
701/410
9,939,814 B1 * 4/2018 Bauer .................. G05D 1/0274
(Continued)

FOREIGN PATENT DOCUMENTS

JP 2005148960 A 6/2005
JP 2007160442 A 6/2007
(Continued)

OTHER PUBLICATIONS

International Search Report (PCT/ISA/210), International Application No. PCT/JP2019/032120, dated Oct. 28, 2019.

*Primary Examiner* — Vivek D Koppikar
*Assistant Examiner* — Dominick Mulder
(74) *Attorney, Agent, or Firm* — Michael Best & Friedrich LLP

(57) ABSTRACT

Mobile devices, control systems and programs are disclosed. In one example, a mobile device performs different processing when an approaching object is a human. The mobile device includes a control unit that performs traveling control. It receives input detection information of a sensor on the mobile device and uses that to determine whether an approaching object is a human. In the case where the control unit determines that the object is a human, the mobile device stops after setting an article mounted in the mobile device in a direction of being visible to the human. In the case where the control unit determines that the object is not a human, the control unit stops or backs the mobile device or changes a traveling direction of the mobile device so as to avoid collision with the object.

17 Claims, 26 Drawing Sheets

(51) Int. Cl.
  *G01C 21/20* (2006.01)
  *G08G 1/16* (2006.01)
  *G06V 40/10* (2022.01)
  *G06V 40/16* (2022.01)
(52) U.S. Cl.
  CPC ......... *G05D 1/0223* (2013.01); *G05D 1/0231* (2013.01); *G06V 40/103* (2022.01); *G06V 40/166* (2022.01); *G08G 1/166* (2013.01)
(58) Field of Classification Search
  CPC .. G05D 1/0246; G05D 1/0274; G01C 21/206; G06V 40/103; G06V 40/166; G08G 1/166
  USPC ............................................................ 701/26
  See application file for complete search history.

(56) References Cited

U.S. PATENT DOCUMENTS

| | | | | |
|---|---|---|---|---|
| 10,757,323 | B2* | 8/2020 | Alameh | H04N 23/69 |
| 10,898,999 | B1* | 1/2021 | Cohen | B25J 9/0003 |
| 2007/0150106 | A1 | 6/2007 | Hashimoto et al. | |
| 2013/0317642 | A1* | 11/2013 | Asaria | G06Q 10/08 |
| | | | | 700/216 |
| 2014/0112550 | A1* | 4/2014 | Hanna | G06V 40/70 |
| | | | | 382/117 |
| 2017/0112345 | A1* | 4/2017 | Frey | G05B 15/02 |
| 2017/0315559 | A1* | 11/2017 | Etoh | G05D 1/0088 |
| 2017/0337506 | A1* | 11/2017 | Wise | G05B 19/418 |
| 2017/0368691 | A1* | 12/2017 | Li | B25J 9/1676 |
| 2018/0043542 | A1* | 2/2018 | Mascorro Medina | ...... |
| | | | | B25J 11/008 |
| 2018/0047230 | A1* | 2/2018 | Nye | G07C 9/37 |
| 2018/0201444 | A1* | 7/2018 | Welty | G06Q 50/28 |
| 2018/0246525 | A1* | 8/2018 | Hiramatsu | G05D 1/0282 |
| 2019/0026576 | A1* | 1/2019 | Zhang | G06V 40/19 |
| 2019/0077407 | A1* | 3/2019 | Miura | G01S 7/4039 |
| 2020/0050839 | A1* | 2/2020 | Wolf | G06F 18/2321 |
| 2020/0341480 | A1* | 10/2020 | Jung | G05D 1/0246 |

FOREIGN PATENT DOCUMENTS

| | | | | |
|---|---|---|---|---|
| JP | 2015227145 A | * | 12/2015 | ............ B60W 10/06 |
| WO | 2014/069584 A1 | | 5/2014 | |
| WO | 2016/076148 A1 | | 5/2016 | |

\* cited by examiner

FIG. 5
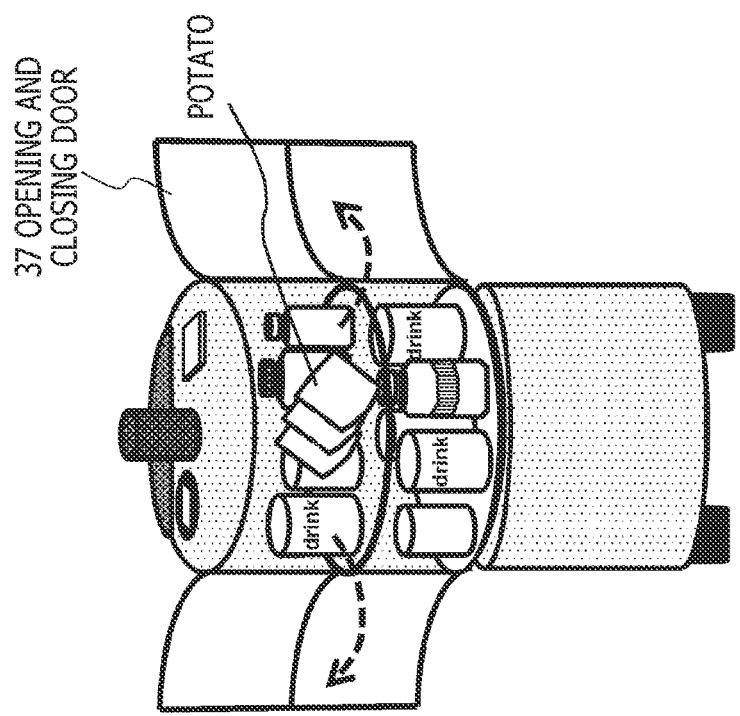
(b1) BACK (OPENING AND CLOSING DOOR CLOSED STATE)
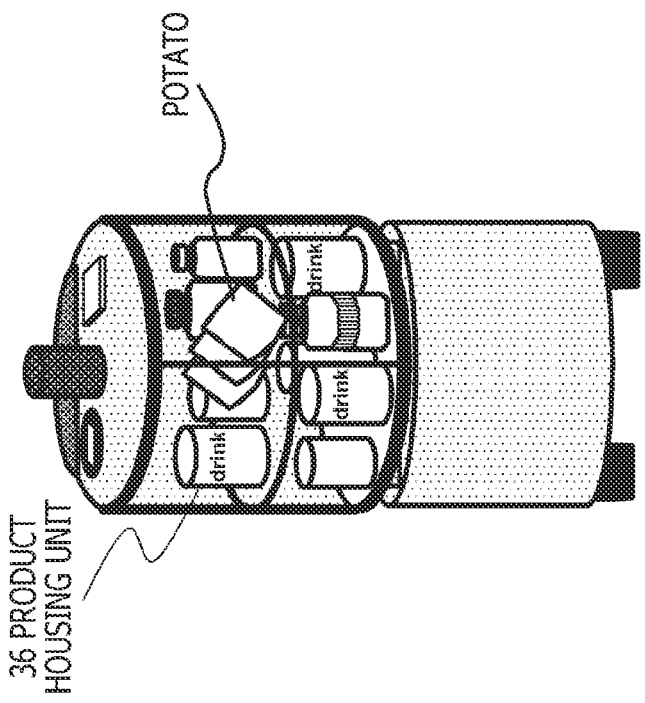
(b2) BACK (OPENING AND CLOSING DOOR OPENED STATE)

FIG. 14

| ID | (a) TRAVELING SURFACE CHARACTERISTICS | | (b) SPEED | (c) NOISE LEVEL |
|---|---|---|---|---|
| | IMAGE | MATERIAL | | |
| 101 | | CARPET | HIGH SPEED (5 m/s) | 30dB |
| 102 | | CARPET | MEDIUM SPEED (3 m/s) | 20dB |
| 103 | | CARPET | LOW SPEED (1 m/s) | 10dB |
| 201 | | STONE FLOOR | HIGH SPEED (5 m/s) | 70dB |
| 202 | | STONE FLOOR | MEDIUM SPEED (3 m/s) | 60dB |
| 203 | | STONE FLOOR | LOW SPEED (1 m/s) | 50dB |
| 301 | | WOODEN FLOOR | HIGH SPEED (5 m/s) | 50dB |
| 302 | | WOODEN FLOOR | MEDIUM SPEED (3 m/s) | 40dB |
| 303 | | WOODEN FLOOR | LOW SPEED (1 m/s) | 30dB |
| ⋮ | | ⋮ | ⋮ | ⋮ |

F I G. 15

| | CONFERENCE ROOM USAGE CONDITIONS | ALLOWABLE NOISE LEVEL |
|---|---|---|
| (1) | UNUSED | 60dB |
| (2) | ORDINARY CONFERENCE IS BEING HELD | 40dB |
| (3) | IMPORTANT CONFERENCE IS BEING HELD | 20dB |
| ... | ... | ... |

FIG. 18

| ID | (1) POSITION COORDINATE (x,y) (POSITION IDENTIFICATION INFORMATION) | (2) TRAVELING SURFACE CHARACTERISTICS | | (3) SPEED | (4) NOISE LEVEL |
|---|---|---|---|---|---|
| | | IMAGE | MATERIAL | | |
| A101 | (WITHIN CONFERENCE ROOM A) | 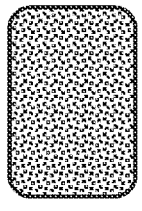 | CARPET | HIGH SPEED (5 m/s) | 30dB |
| A102 | | | | MEDIUM SPEED (3 m/s) | 20dB |
| A103 | | | | LOW SPEED (1 m/s) | 10dB |
| B201 | (RIGHT SIDE OF PASSAGE IN VICINITY OF CONFERENCE ROOM A) | 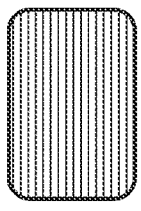 | WOODEN FLOOR | HIGH SPEED (5 m/s) | 50dB |
| B202 | | | | MEDIUM SPEED (3 m/s) | 40dB |
| B203 | | | | LOW SPEED (1 m/s) | 30dB |
| C301 | (ELEVATOR HALL) | 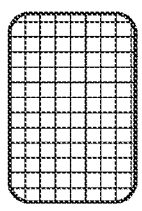 | STONE FLOOR | HIGH SPEED (5 m/s) | 60dB |
| C302 | | | | MEDIUM SPEED (3 m/s) | 50dB |
| C303 | | | | LOW SPEED (1 m/s) | 40dB |
| .. | .. | .. | .. | .. | .. |

MOBILE DEVICE, MOBILE DEVICE CONTROL SYSTEM, METHOD, AND PROGRAM

TECHNICAL FIELD

The present disclosure relates to a mobile device, a mobile device control system, a method, and a program. More particularly, the present disclosure relates to a mobile device that travels autonomously within an office, for example, a mobile device control system, a method, and a program.

BACKGROUND ART

Recently, development of robots and automobiles of an automatic traveling type has been actively performed. However, when an autonomously traveling robot is made to travel in, for example, an office, a factory, a warehouse, or the like, a possibility of collision with a human or various obstacles is increased.

There is PTL 1 (Japanese Patent Laid-Open No. H10-213292), for example, as a conventional technology disclosed with regard to means for solving this problem.

PTL 1 discloses a configuration that detects whether or not there is a human in surroundings by using a sensor mounted on a mobile unit. However, this conventional technology does not provide a disclosure with regard to a configuration that performs processing different according to whether or not an object approaching the mobile unit is a human.

Different processing needs to be performed according to whether or not an object approaching the mobile unit is a human in order for an autonomous traveling type mobile unit to travel swiftly and safely in a place where there are many people and many obstacles such as desks, tables, and chairs, the place being business premises or an office, a restaurant, or a passage in a train.

CITATION LIST

Patent Literature

[PTL 1]
Japanese Patent Laid-Open No. H10-213292

SUMMARY

Technical Problem

It is an object of the present disclosure to provide a mobile device, a mobile device control system, a method, and a program that realize swift and safe traveling in a place where there are many people and obstacles such as tables, and chairs, the place being, for example, business premises or an office, a restaurant, or a passage in a train.

Solution to Problem

According to a first aspect of the present disclosure, there is provided a mobile device including a control unit configured to perform traveling control of the mobile device. The control unit is configured to receive input detection information of a sensor mounted on the mobile device, determine whether or not an object approaching the mobile device is a human on a basis of the input sensor detection information, and perform control different between a case where the control unit determines that the object is a human and a case where the control unit determines that the object is not a human.

Further, according to a second aspect of the present disclosure, there is provided a mobile device control system including a mobile device and a building management server. The building management server retains an allowable noise record map on which an allowable noise level corresponding to a position is recorded, and the mobile device performs traveling speed control according to a traveling position such that a noise level is equal to or lower than the allowable noise level according to the allowable noise record map.

Further, according to a third aspect of the present disclosure, there is provided a mobile device control method performed in a mobile device. The method includes, by a control unit of the mobile device, receiving input detection information of a sensor mounted on the mobile device, determining whether or not an object approaching the mobile device is a human on a basis of the input sensor detection information, and performing control different between a case where the control unit determines that the object is a human and a case where the control unit determines that the object is not a human.

Further, according to a fourth aspect of the present disclosure, there is provided a mobile device control method performed in a mobile device control system including a mobile device and a building management server. The method includes, by the building management server, retaining an allowable noise record map on which an allowable noise level corresponding to a position is recorded, and by the mobile device, performing traveling speed control according to a traveling position such that a noise level is equal to or lower than the allowable noise level according to the allowable noise record map.

Further, according to a fifth aspect of the present disclosure, there is provided a program for making mobile device control processing performed in a mobile device, the program making a control unit of the mobile device, receive input detection information of a sensor mounted on the mobile device, determine whether or not an object approaching the mobile device is a human on a basis of the input sensor detection information, and perform control different between a case where the control unit determines that the object is a human and a case where the control unit determines that the object is not a human.

Incidentally, the programs according to the present disclosure are, for example, programs that can be provided by a storage medium provided in a computer readable form to an information processing device or a computer system capable of executing various program codes and a communication medium. Processing corresponding to the programs is implemented on the information processing device or the computer system by providing such programs in a computer readable form.

Further and other objects, features, and advantages of the present disclosure will become apparent from more detailed description based on embodiments of the present disclosure to be described later and the accompanying drawings. Incidentally, a system in the present specification is a logical set configuration of a plurality of devices and is not limited to a system in which the devices of respective configurations are located within a same casing.

Advantageous Effect of Invention

According to a configuration of one embodiment of the present disclosure, a mobile device is realized which performs processing different according to whether or not an object approaching the mobile device is a human.

Specifically, for example, the mobile device includes a control unit configured to perform traveling control of the mobile device. The control unit receives input detection information of a sensor mounted on the mobile device, determines whether or not an object approaching the mobile device is a human on the basis of the input sensor detection information, and performs control different between a case where the control unit determines that the object is a human and a case where the control unit determines that the object is not a human. In the case where the control unit determines that the object is a human, the mobile device stops after setting an article mounted in the mobile device in a direction of being visible to the human. In the case where the control unit determines that the object is not a human, the control unit stops or backs the mobile device or changes a traveling direction of the mobile device so as to avoid collision with the object.

According to this configuration, a mobile device is realized which performs processing different according to whether or not an object approaching the mobile device is a human.

It is to be noted that effect described in the present specification is merely illustrative and is not limited, and that there may be additional effects.

BRIEF DESCRIPTION OF DRAWINGS

FIG. 5 is a diagram of assistance in explaining the configuration of the mobile device.

FIG. 14 is a diagram of assistance in explaining an example of "traveling surface corresponding noise information" retained by the building management server.

FIG. 15 is a diagram of assistance in explaining "room corresponding allowable noise information" as data that is retained by the building management server and in which allowable noise levels corresponding to the usage conditions of conference rooms are recorded.

FIG. 18 is a diagram of assistance in explaining an example of data obtained in the processing performed in the noise measuring processing performed to generate the "traveling surface corresponding noise information."

DESCRIPTION OF EMBODIMENT

Details of a mobile device, a mobile device control system, a method, and a program according to the present disclosure will hereinafter be described with reference to the drawings. Incidentally, description will be made according to the following items.

1. Outline of Mobile Device according to Present Disclosure
2. Example of Configuration of Communication Network Including Mobile Device
3. Configuration of Mobile Device
4. Processing Performed in Case where Mobile Device Approaches Obstacle
5. Traveling Control of Mobile Device with Noise Taken into Consideration
6. Example of Traveling Processing of Mobile Device on Basis of Cooperation between Mobile Device and Building Management Server
7. Example of Hardware Configuration of Mobile Device
8. Example of Hardware Configuration of Other Devices
9. Summary of Configuration according to Present Disclosure

[1. Outline of Mobile Device According to Present Disclosure]

An outline of a mobile device according to the present disclosure will first be described with reference to FIG. 1 and the following figures.

The mobile device according to the present disclosure is a mobile device that realizes safe traveling in a place where there are many people and obstacles, the place being business premises, an office, a restaurant, a passage in a train, a station, an airport, an outdoor event venue, or the like.

Figure 1:
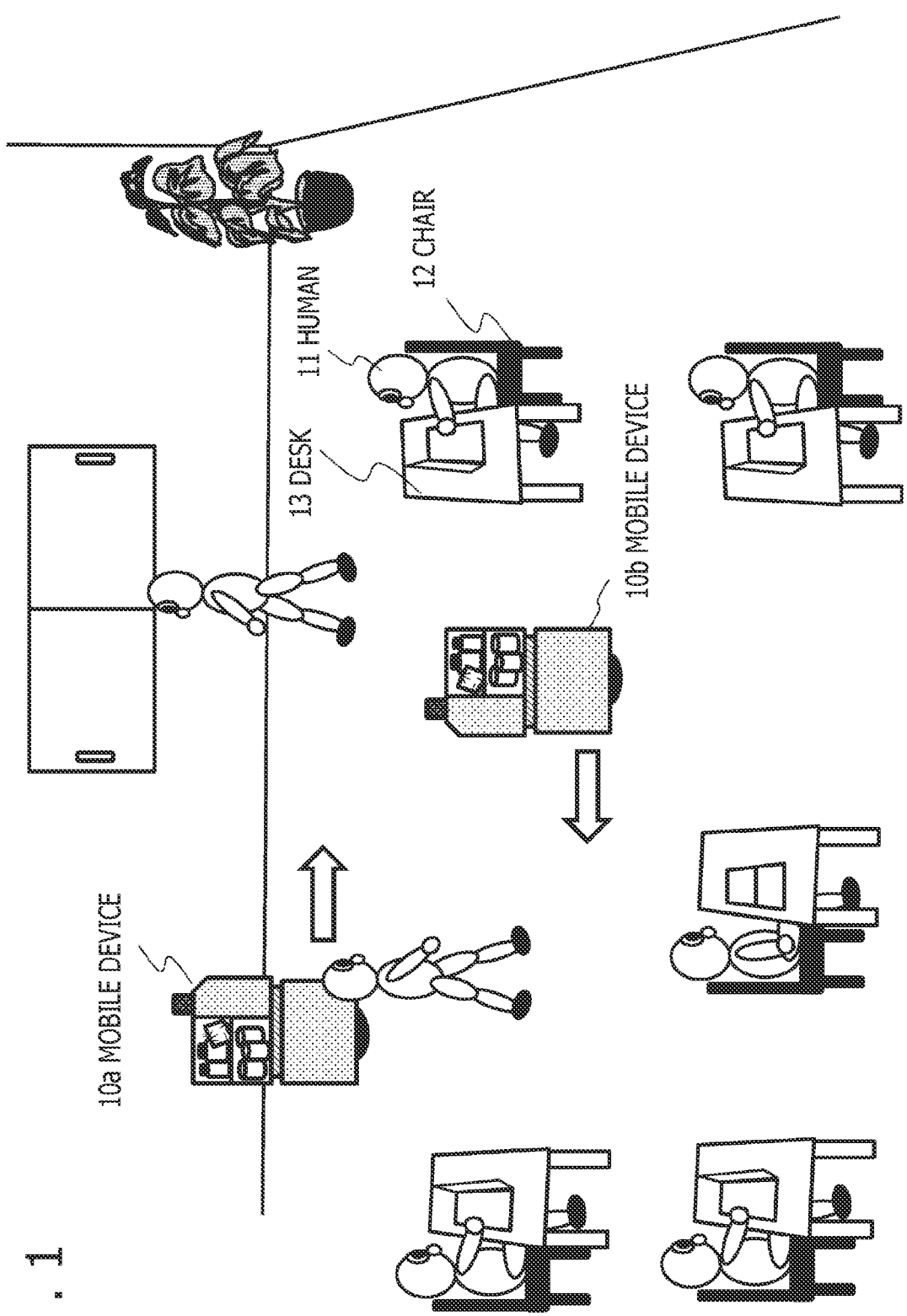
FIG. 1 is a diagram of assistance in explaining an example of usage of mobile devices.

FIG. 1 illustrates an office as an example of a traveling place.

In the office, there are many obstacles such as a person (user) 11, a desk 12, and a chair 13. The mobile device 10 travels so as not to come into contact with these obstacles.

FIG. 1 illustrates two mobile devices 10a and 10b that travel within the office.

These mobile devices 10, for example, travel within the office while housing refreshments such as beverages, and confectionery within a case. The mobile devices 10 can stop in response to a request of a user within the office, and the user can purchase a beverage or the like housed within the mobile devices 10.

The mobile devices 10 have a settlement function similar to that of a vending machine. The mobile devices 10, for example, have a cash insertion unit, a reader-writer function that performs settlement using an IC card, and the like.

Incidentally, the mobile devices 10 can be not only stopped at a stop position determined in advance but also stopped by a user operation on a stop button provided to the mobile devices 10.

Further, the mobile devices 10 can be stopped according to a stop request output from a communication terminal such as a PC, or a smartphone used by the user.

In addition, the user performs a predetermined gesture such as waving a hand to the mobile devices 10, and the mobile devices 10 can be stopped by recognizing the gesture of the user by a camera provided to the mobile device 10.

Alternatively, the mobile devices 10 can be stopped by recognizing calling, that is, voice of the user.

These concrete functions of the mobile devices 10 will be described later.

[2. Example of Configuration of Communication Network Including Mobile Device]

An example of a configuration of a communication network including the mobile devices 10 will next be described with reference to FIG. 2.

Figure 2:
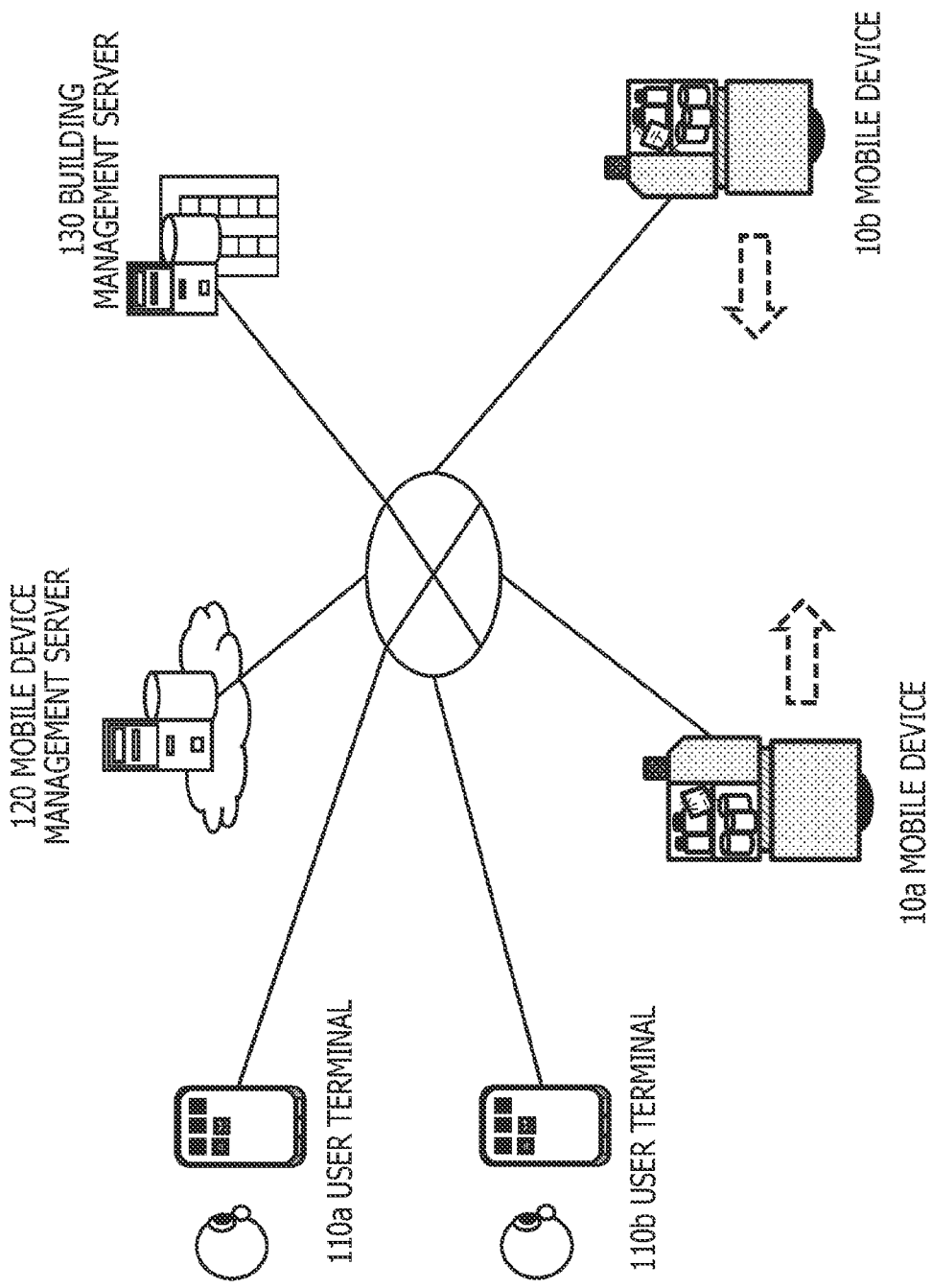
FIG. 2 is a diagram of assistance in explaining an example of a configuration of a communication system for the mobile devices.

FIG. 2 illustrates an example of a network configuration of a communication system including the mobile devices 10.

FIG. 2 illustrates not only the mobile devices 10 but also user terminals 110 such as smartphones, a mobile device management server 120 as a system on a cloud, and a building management server 130 that manages a building in which the mobile devices 10 travel. These devices have a configuration that can communicate via a network.

A user can, for example, make a request to call a mobile device 10 by using the user terminal 110.

The calling request input to the user terminal 10 is transmitted to the mobile device management server 120. The mobile device management server 120 notifies a mobile device 10 closest to the calling user of a traveling instruction having a calling user position as a destination.

Receiving the traveling instruction from the mobile device management server 120, the mobile device 10 sets a traveling route having the position of the calling user as a destination and starts traveling.

The mobile device 10 has a traveling route setting function and a self-position estimating function. The mobile device 10 can thus configure the traveling route by itself and travel.

Incidentally, the traveling route may be generated on the mobile device management server 120 side, and the mobile device 10 may travel according to the traveling route.

The building management server 130 is a server that manages the building in which the mobile device 10 travels. Specifically, the building management server 130 performs operation control of an elevator, opening and closing control of a security door, usage management of conference rooms within the building, analysis processing of an image photographed by a surveillance camera within the building, and the like.

These of pieces of information are provided to the mobile device 10 and the mobile device management server 120 as required.

In addition, the mobile device management server 120 and the building management server 130 share detailed map information regarding the traveling area of the mobile device 10. The mobile device 10 obtains the map information as required and performs traveling control such as the setting of a traveling route, and the setting of a traveling speed. A concrete processing example thereof will be described later.

[3. Configuration of Mobile Device]

A configuration of the mobile device 10 will next be described.

The mobile device 10 has a plurality of sensors in order to realize safe traveling in a place where there are many people and obstacles, the place being business premises or an office, a restaurant, a passage in a train, or the like.

Figure 3:
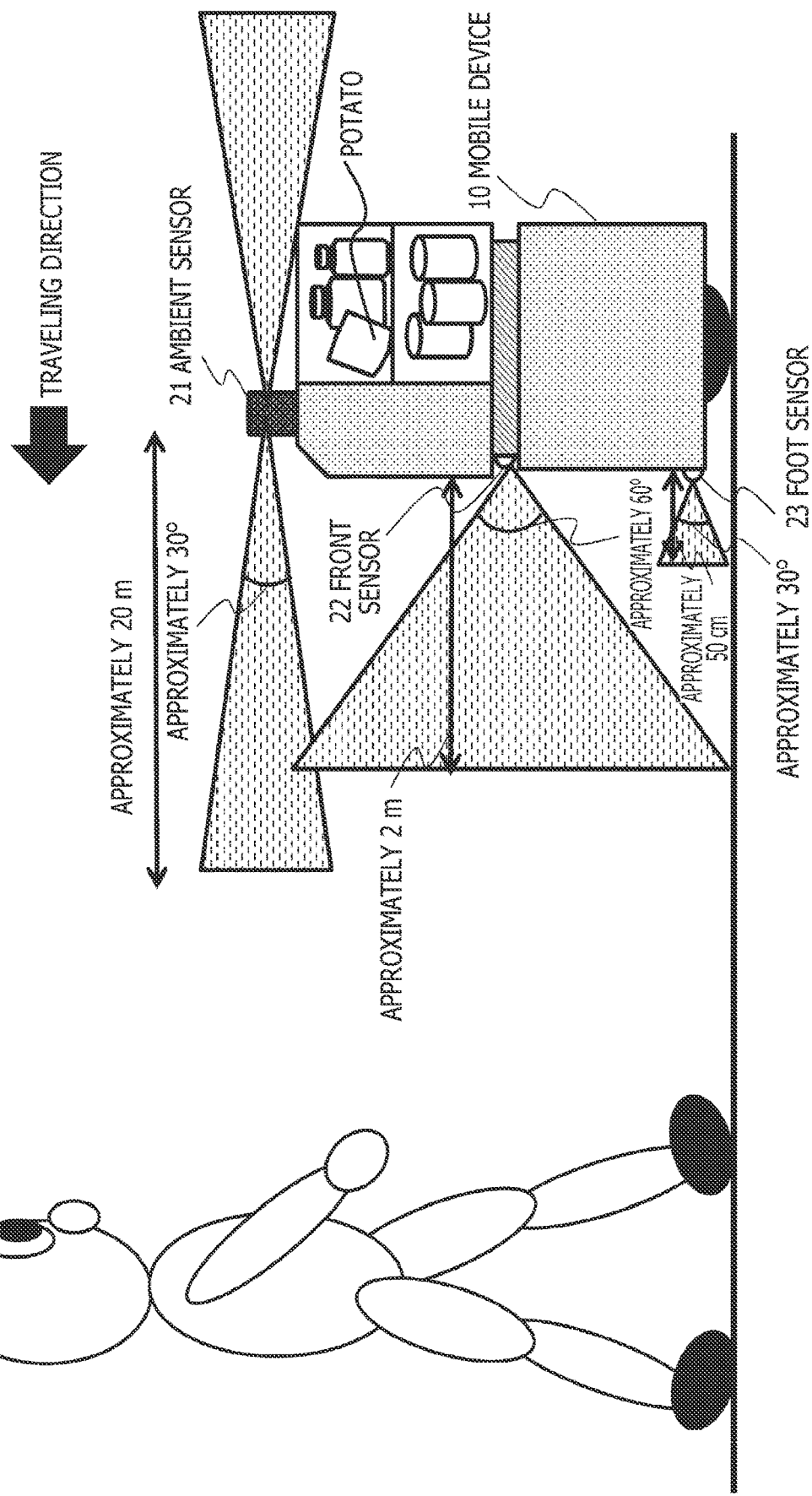
FIG. 3 is a diagram of assistance in explaining a plurality of sensors mounted on a mobile device.

FIG. 3 is a diagram illustrating a state in which the mobile device 10 is approaching a user (human) 11.

When the mobile device 10 continues traveling in such a state, the mobile device 10 collides with the user (human) 11.

In order to avoid such collision or contact, the mobile device 10 is provided with a plurality of sensors.

The plurality of sensors mounted on the mobile device 10 will be described with reference to FIG. 3.

As illustrated in FIG. 3, the mobile device 10 is mounted with the following three kinds of sensors.

(a) an ambient sensor 21,
(b) a front sensor 22, and
(c) a foot sensor 23.

(a) The ambient sensor 21 is a sensor that detects the conditions of surroundings of the mobile device 10. The ambient sensor 21 is attached to an upper portion of the mobile device 10.

The mobile device 10 is, for example, in a cylindrical shape having a height of approximately 1 m. The ambient sensor 21 is set to include, in a sensing region, the height of an upper surface of a desk or a table placed in the office.

As described earlier, the mobile device 10 is assumed to be used in a place where people gather, the place being an office, a restaurant, or the like. Many desks or tables are often placed in such an office or a restaurant. The mobile device 10 needs to recognize the positions of these desks and tables surely in order to travel safely.

The ambient sensor 21 therefore has a configuration including a height region of the upper surfaces of the desks and the tables as a sensing region.

As illustrated in FIG. 3, the ambient sensor 21 sets a region with a spreading angle of approximately 30° and a radius of approximately 20 m from the sensor as a sensing region, and detects the presence or absence of an obstacle within this region, a distance to the obstacle, and the like.

Many desks and tables present in offices and restaurants have a height of approximately 60 to 80 cm. The ambient sensor 21 is set to include heights=60 to 80 cm of the desks and tables in a sensing region.

Incidentally, detection information of the ambient sensor 21 is input to a control unit (data processing unit) of the mobile device 10, and is used to detect an obstacle in surroundings and used also for self-position estimation processing of the mobile device 10.

The mobile device 10 needs to move according to a route specified in advance or a route set by calling of the user. This movement needs processing of estimating a self-position.

The detection information of the ambient sensor 21 is used for the self-position estimation processing.

The ambient sensor 21 includes specifically, for example, either a lidar (LiDAR: Light Detection and Ranging, Laser Imaging Detection and Ranging) obtaining ambient information using pulsed laser light, an omnidirectional camera capable of photographing entire surroundings, a fish-eye camera, or the like, or a combination thereof.

(b) The front sensor 22 is a sensor that detects conditions in a frontward direction as a traveling direction of the mobile device 10. The front sensor 22 is attached to a middle part position of the front of the mobile device 10.

The front sensor 22 is set to include the height of the seating surface of a chair placed in the office in a sensing region.

As described earlier, the mobile device 10 is assumed to be used in a place where people gather, the place being an office, a restaurant, or the like. In such an office or a restaurant, many desks or tables are arranged, as described above, and further there are also many chairs.

In order for the mobile device 10 to travel safely, the mobile device 10 needs to surely recognize also the positions of the chairs in addition to the desks or the tables.

The front sensor 22 is therefore set to include the height of the seating surfaces of the chairs in the sensing region.

As illustrated in FIG. 3, the front sensor 22 sets a region of approximately 2 m in a forward direction from the sensor with a spreading angle of approximately 60° as the sensing region, and detects the presence or absence of an obstacle within this region, a distance to the obstacle, and the like.

The seating surfaces of many chairs present in offices and restaurants have a height of approximately 40 cm. The front sensor 22 sets a region including this chair seating surface height=40 cm as the sensing region.

Incidentally, detection information of the front sensor 22 is input to the control unit (data processing unit) of the mobile device 10 and is used to detect an obstacle ahead.

The front sensor 22 includes specifically, for example, either a ToF (Time of Flight) sensor, a camera, or the like, or a combination thereof.

As with the front sensor 22, (c) the foot sensor 23 is also a sensor that detects conditions in the frontward direction as the traveling direction of the mobile device 10. However, the foot sensor 23 is a sensor that detects mainly an obstacle in a foot position in front of the mobile device 10.

The foot sensor 23 is attached in a position of being able to detect an obstacle in a region as a blind spot of the front sensor 22.

Specifically, the foot sensor 23 is attached to a lower position of the mobile device 10.

As illustrated in FIG. 3, the foot sensor 23 sets a region of approximately 50 cm in a forward direction from the sensor with a spreading angle of approximately 30° as a sensing region, and detects the presence or absence of an obstacle within this region, a distance to the obstacle, and the like.

The foot sensor 23 can, for example, detect a shoe of a human, or the like.

Incidentally, detection information of the foot sensor 23 is input to the control unit (data processing unit) of the mobile device 10 and is used to detect an obstacle of a foot in front.

The foot sensor 23 includes specifically, for example, either a LiDAR, a distance sensor, a bumper sensor, a camera, or the like, or a combination thereof.

Incidentally, in the example illustrated in FIG. 3, the mobile device 10 has a configuration with these three sensors,
  (a) the ambient sensor 21 on the upper portion of the mobile device 10,
  (b) the front sensor 22 on the middle part position of the mobile device 10, and
  (c) the foot sensor 23 on the lower portion of the mobile device 10.

However, it is also possible, for example, to make a configuration in which the foot sensor is omitted by widening the detection range of the front sensor 22, or conversely make a configuration in which the front sensor 22 is omitted by widening the detection range of the foot sensor 23.

In addition, it is also possible to make a configuration in which an omnidirectional sensor capable of recognizing conditions not only in front but also in surroundings is attached to the middle part of the mobile device 10, and also has the function of the ambient sensor 21, and thereby the ambient sensor 21 on the upper portion of the mobile device 10 is omitted.

The mobile device 10 inputs the detection information of the sensors to the control unit (data processing unit) of the mobile device 10. The control unit performs detection of an obstacle and the like.

For example, the control unit stops the mobile device 10 in a case where the mobile device 10 has approached an obstacle to a distance specified in advance or in a case where the mobile device 10 accidentally comes into contact with an obstacle.

In addition, the control unit (data processing unit) determines whether or not an object approaching the mobile device 10 is a human on the basis of sensor detection information including a camera or the like. In addition, in a case where the object is a human, processing of determining whether or not the human is oriented full face with a face thereof oriented to the mobile device 10 side is also performed. These pieces of processing are performed by processing of checking against human or face pattern data stored in a storage unit of the mobile device 10, for example.

In the case where the control unit of the mobile device 10 performs determination processing as to whether or not the approaching object is a human, and performs determination processing as to whether or not the human is oriented full face in a case where the approaching object is a human, the control unit performs processing using learning data for determination, the learning data being stored in the storage unit, for example.

A configuration of other than the sensors of the mobile device 10 will next be described with reference to FIG. 4 and FIG. 5.

As described earlier, the mobile device 10 is a mobile device that can travel safely in a place where there are many people and other obstacles, the place being, for example, an office or the like, and can be used as a device that houses and sells products such as beverages, and confectionery, for example.

Incidentally, the mobile device 10 can be not only used as a device that thus houses and sells products but also used as a device that, for example, collects and delivers goods such as stationery or collect trash, and can be used for various other purposes.

Figure 4:
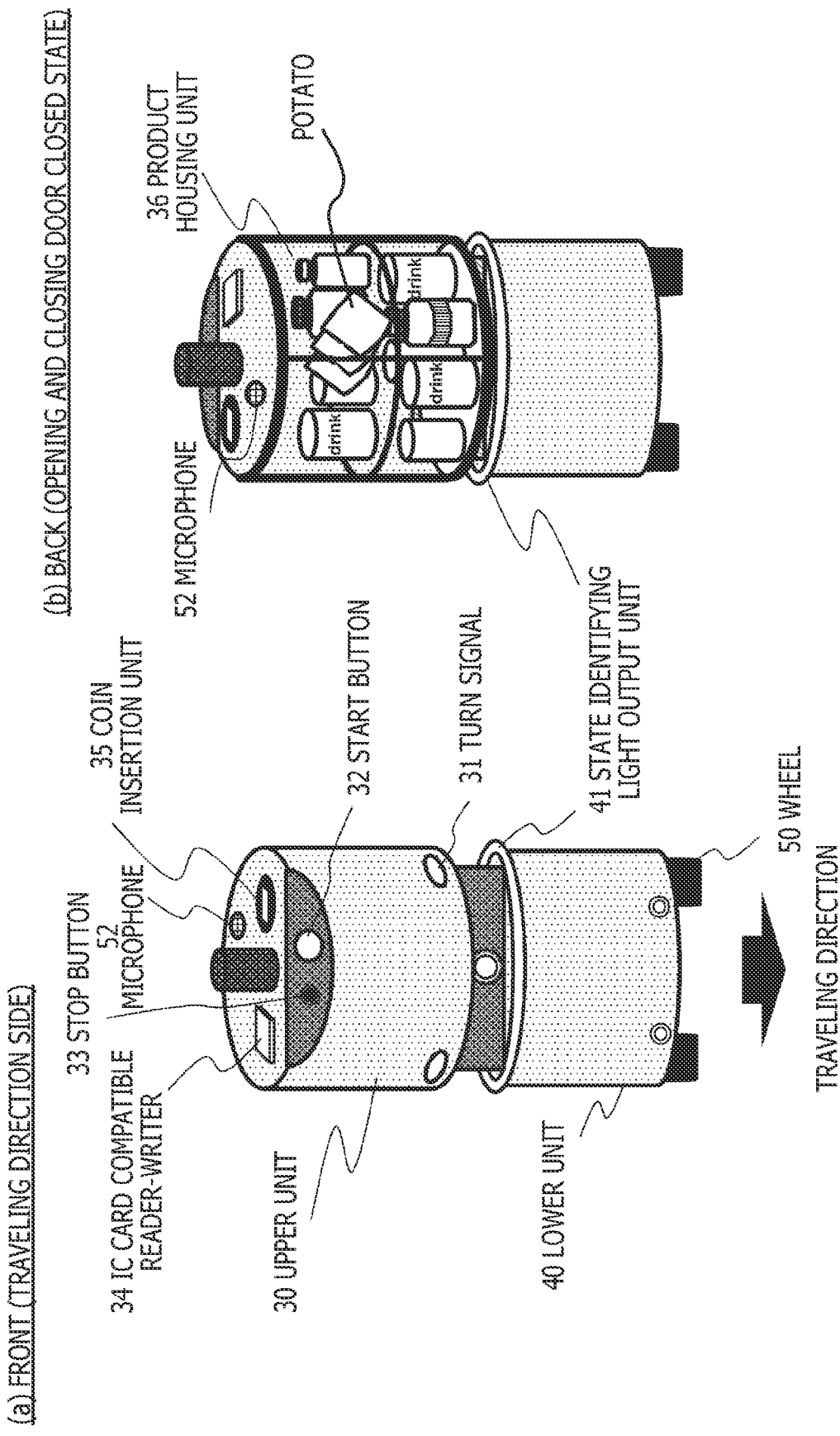
FIG. 4 is a diagram of assistance in explaining a configuration of the mobile device.

FIG. 4 illustrates a diagram of (a) the front (traveling direction side) of the mobile device 10 and a diagram of (b) the back (opening and closing door closed state) of the mobile device 10.

Incidentally, FIG. 5 illustrates respective diagrams of (b1) the back (opening and closing door closed state) and (b2) the back (opening and closing door opened state).

The mobile device 10, for example, has a cylindrical configuration with a diameter of approximately 50 to 80 cm and a height of approximately 80 cm to 1.3 m. This size enables the mobile device 10 to pass through an ordinary passage in an office without any problem, and pass by a human within the passage.

Incidentally, the size and the shape can be set variously according to a usage place and a purpose.

As illustrated in the diagram of (a) the front (traveling direction side) illustrated in FIG. 4, the mobile device 10 includes an upper unit 30, a lower unit 40, and wheels 50.

As illustrated in the diagram of (b) the back (opening and closing door closed state) in FIG. 4, the upper unit 30 is mounted with a product housing unit 36 that houses products such as beverages, and confectionery, for example.

The product housing unit 36 has a configuration detachable from the upper unit 30.

In the case of collecting and delivering goods such as stationery or collecting trash, for example, a storage box according to the purpose is mounted in the upper unit 30.

The lower unit 40 stores the control unit that controls the mobile device 10, a driving unit, a battery, a transformer (DC-to-DC converter), and the like.

As illustrated in the figures, an upper portion of the lower unit 40 is provided with a state identifying light output unit 41. The state identifying light output unit 41 is, for example, a light emitting unit provided in a circular shape on the periphery of the upper portion of the lower unit 40, and is a light emitting unit that can be identified from 360-degree directions of the periphery of the mobile device 10.

The state identifying light output unit 41 is a light emitting unit that outputs different light according to the state of the mobile device 10.

For example,
the state identifying light output unit 41 outputs (emits) green light while the mobile device 10 is traveling.

The state identifying light output unit 41 outputs (emits) blue light while the mobile device 10 is stopped.

The state identifying light output unit 41 outputs (emits) red light in a case where the mobile device 10 comes into contact with any obstacle.

These output light controls are performed by control of the control unit of the mobile device 10.

A person (user) present around the mobile device 10 can sense a change in the state of the mobile device 10 according to a change in the light emission color of this state identifying light output unit 41.

Two wheels 50 are installed in a left part and a right part of the bottom surface of the mobile device. In a case where the mobile device 10 travels forward or in a case where the mobile device 10 travels backward, the two wheels rotate in a same direction.

In addition, in a case where the mobile device 10 rotates (rotates on an own axis) at a predetermined position, the two wheels rotate in respective opposite directions. This processing enables the mobile device 10 to rotate at a fixed position.

Incidentally, a plurality of casters is provided to the bottom surface of the mobile device in order to prevent an overturn and realize free rotation.

As illustrated in the figure, the upper unit 30 is provided with a turn signal 31, a start button 32, a stop button 33, an IC card compatible reader-writer 34, a coin insertion unit 35, and a microphone 52.

The turn signal 31 illuminates under control of the control unit of the mobile device 10 in a case where the mobile device turns right or turns left.

The start button 32 and the stop button 33 are buttons operable by the user. The start button 32 can start the traveling of the mobile device 10 by being depressed by the user when the mobile device 10 is in a stop state.

The stop button 33 can stop the traveling of the mobile device 10 by being depressed by the user when the mobile device 10 is in a traveling state.

The IC card compatible reader-writer 34 performs checkout processing when the user brings an IC card of the user into contact with the IC card compatible reader-writer 34 in a case where the user purchases a product housed within the product housing unit 36, for example.

The coin insertion unit 35 is provided for the user to insert a coin such as cash in a case where the user purchases a product housed within the product housing unit 36.

Incidentally, the checkout processing is performed as processing of the control unit as a data processing unit within the mobile device 10. Alternatively, the checkout processing may be configured to be performed in a server that can communicate with the mobile device 10.

The microphone 52 is a microphone as a voice input unit. Voice information input via the microphone, for example, indication information of the user is input to the control unit of the mobile device 10. The control unit performs voice analysis processing, and performs control based on an analysis result.

Incidentally, the microphone 52 is also used for noise measurement. The mobile device 10 generates noises at levels different according to a traveling speed and a traveling surface.

The mobile device 10, for example, performs low speed traveling in order to reduce noise when passing in front of a conference room in which a conference is being held. A concrete example of this processing will be described later.

FIG. 5 illustrates diagrams of two states of the back of the mobile device 10, that is, (b1) the back (opening and closing door closed state) and (b2) the back (opening and closing door opened state).

An opening and closing door 37 includes a transparent material, so that products on the inside can be observed from the outside. The opening and closing door 37 automatically opens under control of the control unit in a case where an operation of the user is performed or in a case where the mobile device 10 rotates at a stop position and orients the product housing unit 6 to the user side.

This processing enables the user to take out a product such as a beverage, or confectionery from the product housing unit 36.

After the user completes taking out a product and completes a checkout, the user depresses the start button 32. This start button depression processing causes the mobile device 10 to rotate by 180 degrees again at the stop position, and thereafter resume traveling in a direction of going away from the user.

[4. Processing Performed in Case where Mobile Device Approaches Obstacle]

Description will next include processing performed in a case where the mobile device 10 approaches a human or another obstacle.

A processing sequence in a case where the mobile device 10 approaches a human or another obstacle will be described with reference to a flowchart illustrated in FIG. 6 and FIG. 7.

Figure 6:
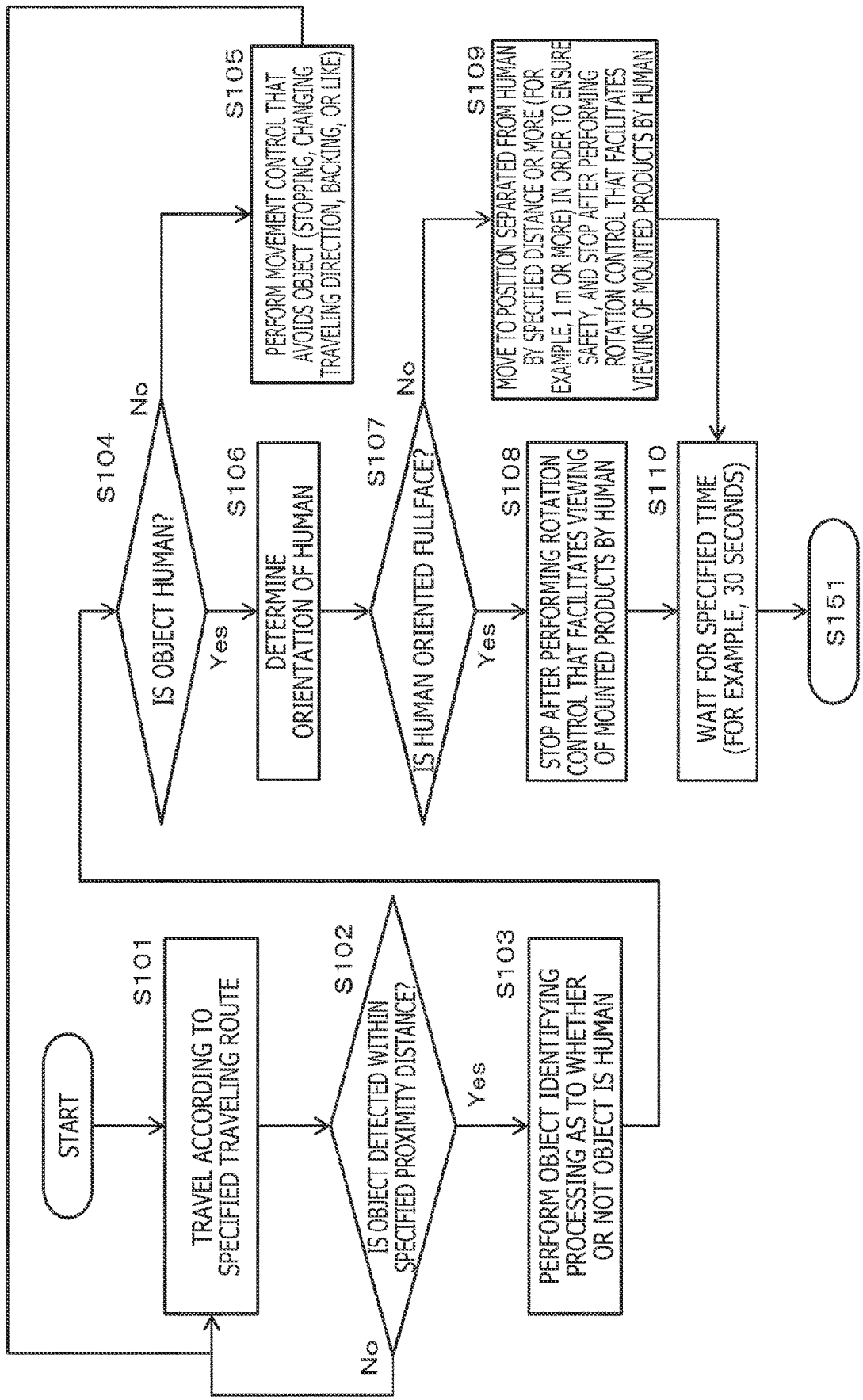
FIG. 6 is a diagram illustrating a flowchart of assistance in explaining processing in a case where the mobile device approaches a human or another obstacle.
Figure 7:
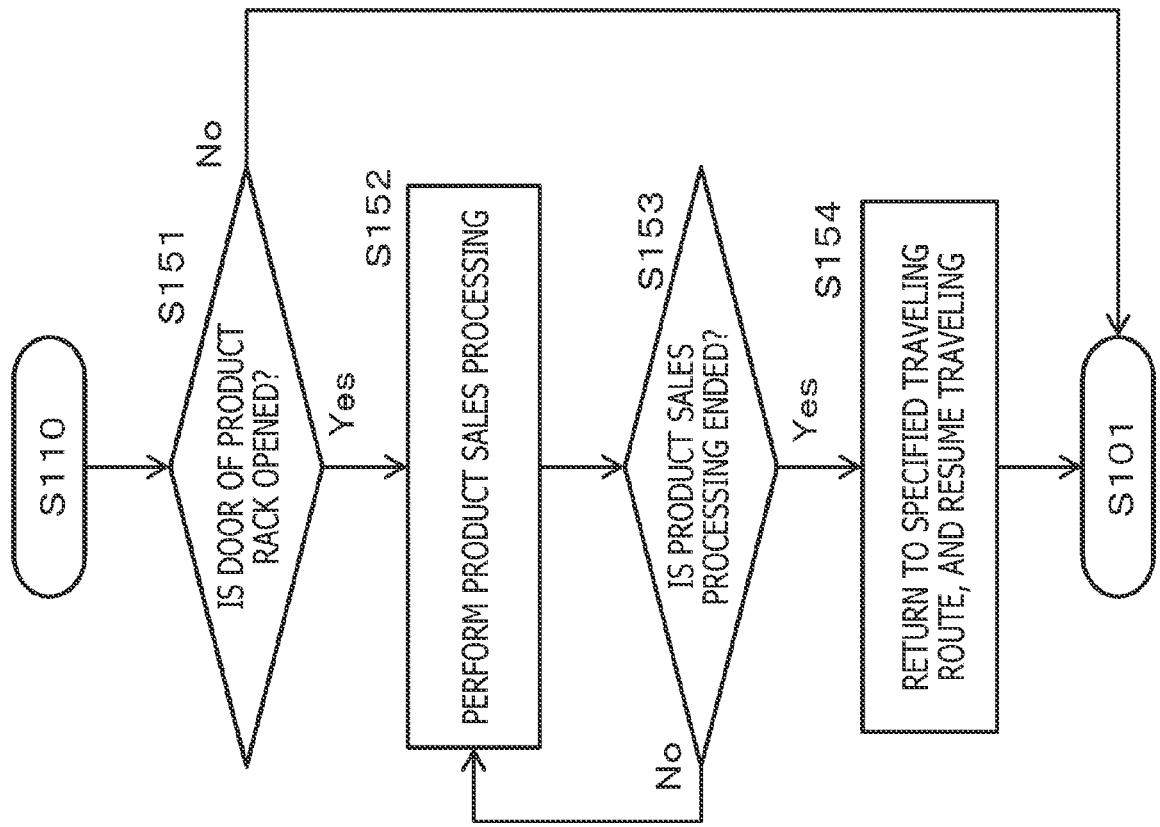
FIG. 7 is a diagram illustrating a flowchart of assistance in explaining the processing in the case where the mobile device approaches a human or another obstacle.

Processing according to the flowchart illustrated in FIG. 6 and FIG. 7 can be performed by the control unit (data processing unit) of the mobile device 10 according to a program stored in the storage unit of the mobile device 10, for example. The processing according to the flowchart illustrated in FIG. 6 and FIG. 7 can, for example, be performed as program execution processing by a processor such as a CPU having a program executing function.

The processing of each step in a flow illustrated in FIGS. 6 and 7 will be described in the following.

(Step S101)

First, in step S101, the mobile device 10 travels according to a specified traveling route.

In a case where there is a call from the user, for example, the mobile device 10 travels according to a route with the position of the calling user as a destination. In addition, in a case where no destination is set, the mobile device 10 travels according to a specified circuit route.

(Step S102)

Next, in step S102, the mobile device 10 determines whether or not an object, that is, an obstacle is detected within a specified proximity distance.

This processing determines whether or not an object is detected within the proximity distance specified in advance, for example, 30 cm.

Incidentally, the proximity distance specified in advance is preferably configured to be changed according to the speed of the mobile device 30. For example, the proximity distance is set to be approximately 20 cm in a case of low speed traveling, and the proximity distance is set to be 50 to 60 cm in a case of high speed traveling. The proximity distance is thus preferably configured to be changed according to the speed of the mobile device 30. This is because of a constraint of a braking system such as working conditions of a brake and a possibility of damaging products unless deceleration is performed slowly by applying the brake early.

Proximity object detection is performed by using the detection information of the sensors described earlier with reference to FIG. 3. In addition, this proximity object detection is performed continuously during the traveling of the mobile device 10.

In a case where the mobile device 10 detects an object within the specified proximity distance in step S102, the mobile device 10 proceeds to step S103. In a case where the mobile device 10 does not detect an object within the specified proximity distance in step S102, on the other hand, the mobile device 10 returns to step S101, and continues traveling.

(Steps S103 to S104)

In the case where the mobile device 10 detects an object within the specified proximity distance in step S102, the mobile device 10 proceeds to step S103.

In step S103, the mobile device 10 performs processing of determining whether the detected object is a human or an object other than a human.

This processing is specifically performed on the basis of, for example, processing of checking the proximity object included in, for example, a photographed image of a camera, detection information from a sensor such as a lidar (LiDAR) against pattern data for human detection, the pattern data being stored in the storage unit in advance. Incidentally, an infrared sensor may be incorporated, and human detection based on detection of a body temperature may be performed. In addition, in the case of performing determination processing as to whether or not the approaching object is a human, processing using learning data for determination, the learning data being stored in the storage unit, for example, may be performed.

In a case where it is determined that the proximity object is not a human (Determination in step S104=No), the processing proceeds to step S105.

In a case where it is determined that the proximity object is a human (Determination in step S104=Yes), on the other hand, the processing proceeds to step S106.

(Step S105)

In the case where it is determined in step S104 that the proximity object is not a human (Determination in step S104=No), the processing proceeds to step S105.

The mobile device 10 in step S105 performs movement control that avoids the proximity object. Specifically, collision with the object is avoided by stopping, changing a traveling direction, or performing backing processing or the like.

The processing thereafter returns to step S101 to return to the traveling processing following the specified route.

(Steps S106 to S107)

In the case where it is determined that the proximity object is a human (Determination in step S104=Yes), on the other hand, the processing proceeds to step S106.

The mobile device 10 in step S106 determines the orientation of the human as the proximity object. This processing is, for example, performed by face detection from a head region of the human which head region is included in a photographed image of a camera. It is determined that the human is oriented full face when eyes, a nose, a mouth, and the like as characteristic information of a face are detected. It is determined that the human is not oriented full face in a case where the eyes, the nose, the mouth, and the like are not detected. The control unit of the mobile device 10 may be configured to perform processing using learning data for determination, the learning data being stored in the storage unit, for example, in the case of performing the determination processing as to whether or not the human is oriented full face.

In a case where it is determined that the human as the proximity object is oriented full face (Determination in step S107=Yes), the processing proceeds to step S108.

In a case where it is determined that the human as the proximity object is not oriented full face (Determination in step S107=No), on the other hand, the processing proceeds to step S109.

(Step S108)

In the case where it is determined in step S107 that the human as the proximity object is oriented full face (Determination in step S107=Yes), the processing proceeds to step S108.

In this case, the mobile device 10 in step S108 stops after performing rotation control that facilitates viewing of the mounted products by the human.

Figure 8:
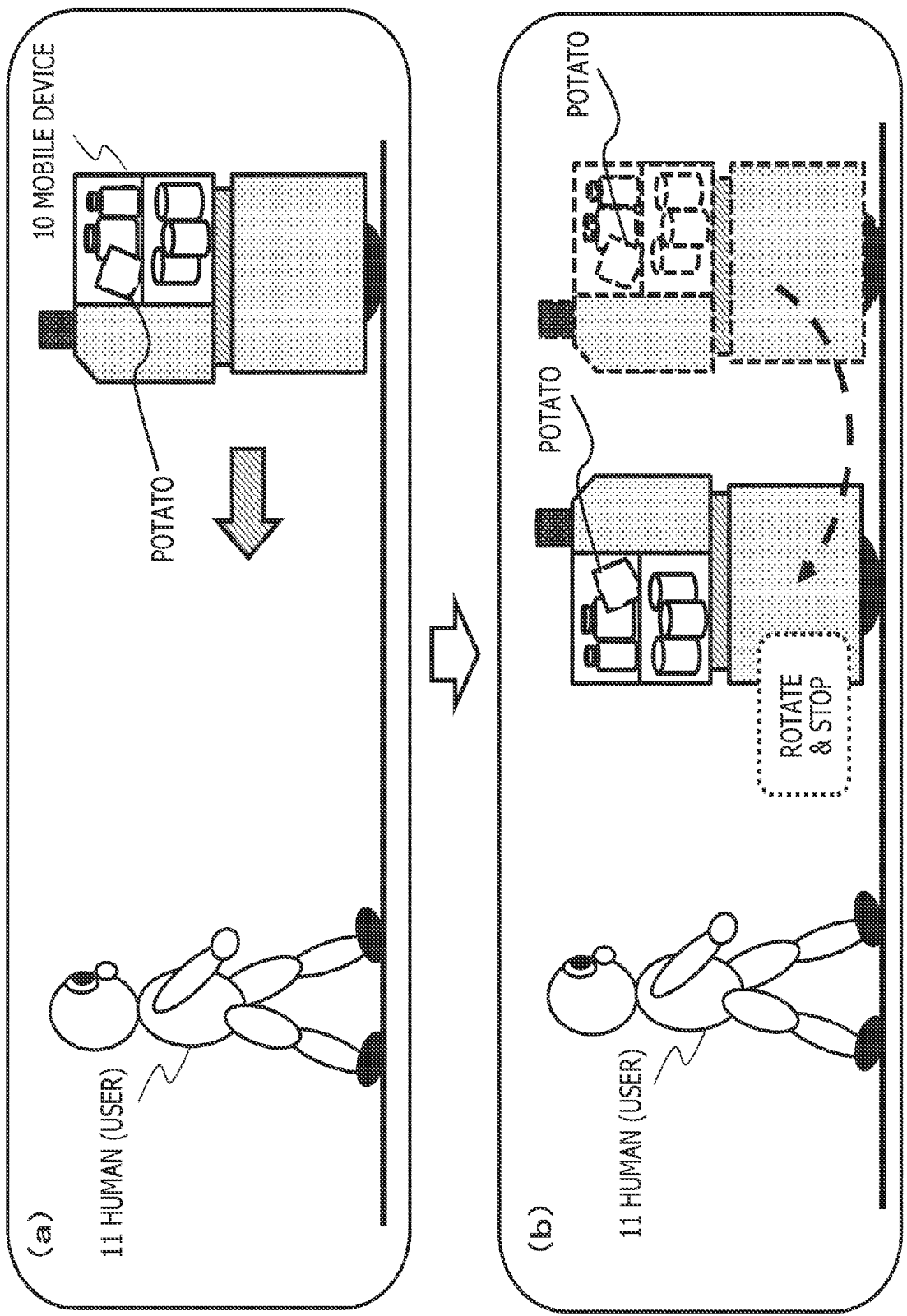
FIG. 8 is a diagram of assistance in explaining processing in a case where the mobile device approaches a human.

A concrete example of this processing will be described with reference to FIG. 8.

Movements of the mobile device 10 illustrated in FIGS. 8(a) and 8(b) represent a concrete example of the processing of step S108.

At a position illustrated in FIG. 8(a), the mobile device 10 detects a human 11 oriented full face as an object in proximity to the mobile device 10. In response to this detection, as illustrated in FIG. 8(b), the mobile device 10 rotates by 180 degrees and stops in order to facilitate the viewing of the products mounted in the mobile device 10 by the human 11.

Thus, in a case where the control unit of the mobile device 10 determines that the human is oriented full face with a face thereof oriented to the mobile device 10 side, the control unit performs control for approaching the human to a distance specified in advance, and stopping after setting the articles mounted in the mobile device 10 in a direction of being visible to the human.

(Step S109)

In the case where it is determined in step S107 that the human as the proximity object is not oriented full face (Determination in step S107=No), on the other hand, the processing proceeds to step S109.

In this case, the mobile device 10 in step S109 moves to a position separated from the human by a specified distance or more (for example, 1 m or more) in order to ensure safety, and stops after performing rotation control that facilitates the viewing of the mounted products by the human.

Figure 9:
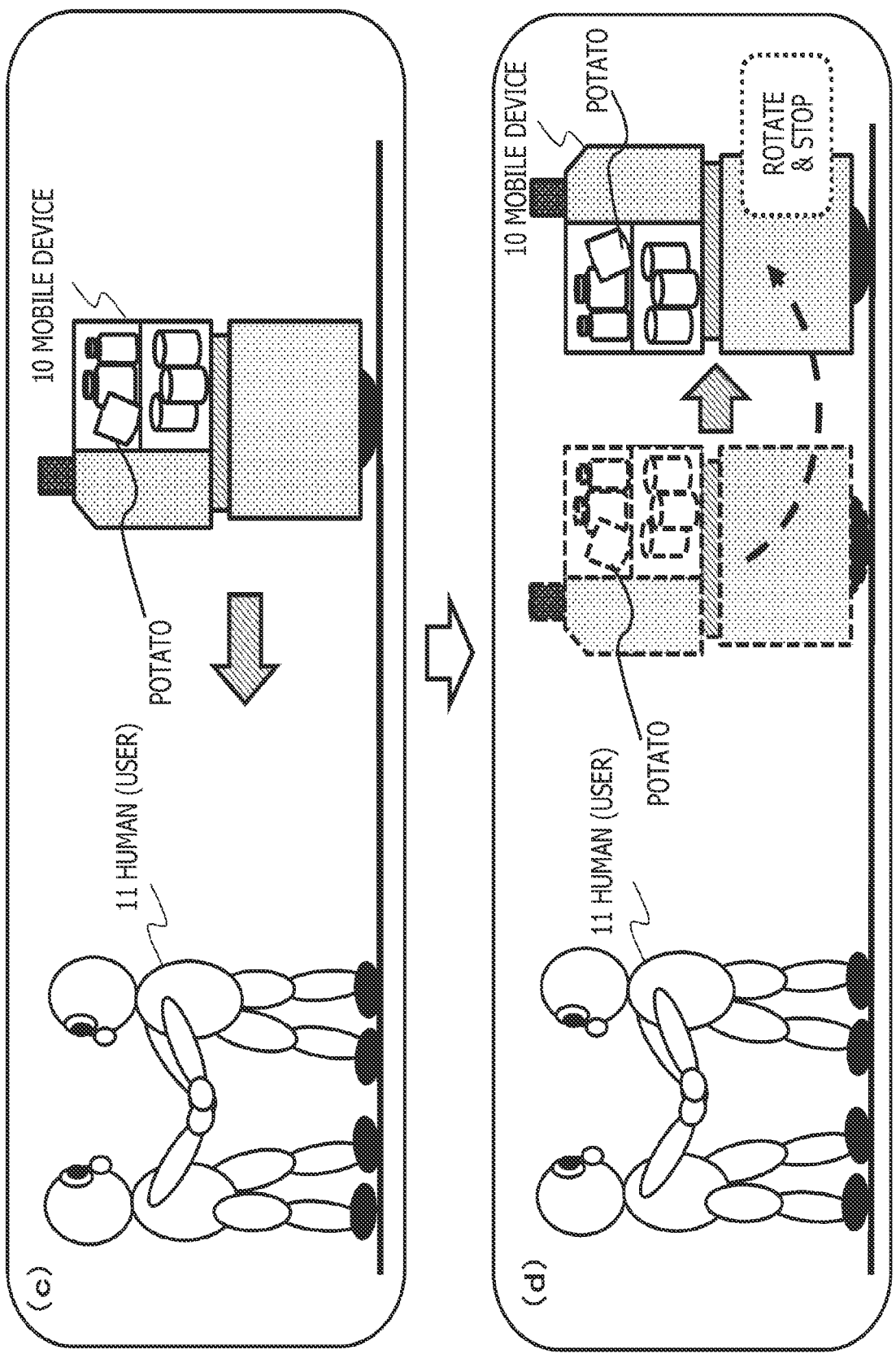
FIG. 9 is a diagram of assistance in explaining processing in a case where the mobile device approaches humans.

A concrete example of this processing will be described with reference to FIG. 9.

Movements of the mobile device 10 illustrated in FIGS. 9(a) and 9(b) represent a concrete example of the processing of step S109.

At a position illustrated in FIG. 9(a), the mobile device 10 detects a human 11 not oriented full face as an object in proximity to the mobile device 10. In response to this detection, as illustrated in FIG. 9(b), the mobile device 10 moves to a position separated from the human 11 by a specified distance or more (for example, 1 m or more), and stops after performing rotation control that facilitates the viewing of the mounted products by the human 11.

Thus, in the case where the control unit of the mobile device 10 determines that the human is not oriented full face with the face thereof oriented to the mobile device 10 side, the control unit performs control for setting the mobile device 10 in a direction of making the mounted items visible to the human and stopping at a position separated from the human by the distance specified in advance or more.

(Step S110)

After performing the processing of step S108 or step S109, the mobile device 10 waits for a specified time (for example, 30 seconds) in step S110.

That is, the mobile device 10 waits in a state of being stopped so as to display the products mounted in the mobile device 10 to the human 11.

(Step S151)

Next, proceeding to step S151 in the flow illustrated in FIG. 7, the mobile device 10 determines whether or not a door of a product rack is opened by the human.

That is, whether or not the door is changed from a closed state to an opened state as described earlier with reference to FIG. 5 is determined. This detection processing is detected by a sensor provided to a door portion.

In a case where it is determined that the door of the product rack is opened by the human, the processing proceeds to step S152. In a case where the door of the product rack is not opened, on the other hand, the processing returns to step S101, and the mobile device 10 resumes traveling according to the specified traveling route.

(Step S152)

In the case where it is determined in step S151 that the door of the product rack is opened by the human, the processing proceeds to step S152.

In step S152, the mobile device 10 performs product sales processing. Specifically, the mobile device 10 identifies a product taken out by the user 11, and further performs communication with the mobile device management server 120 or the like and performs payment processing or the like.

Figure 10:
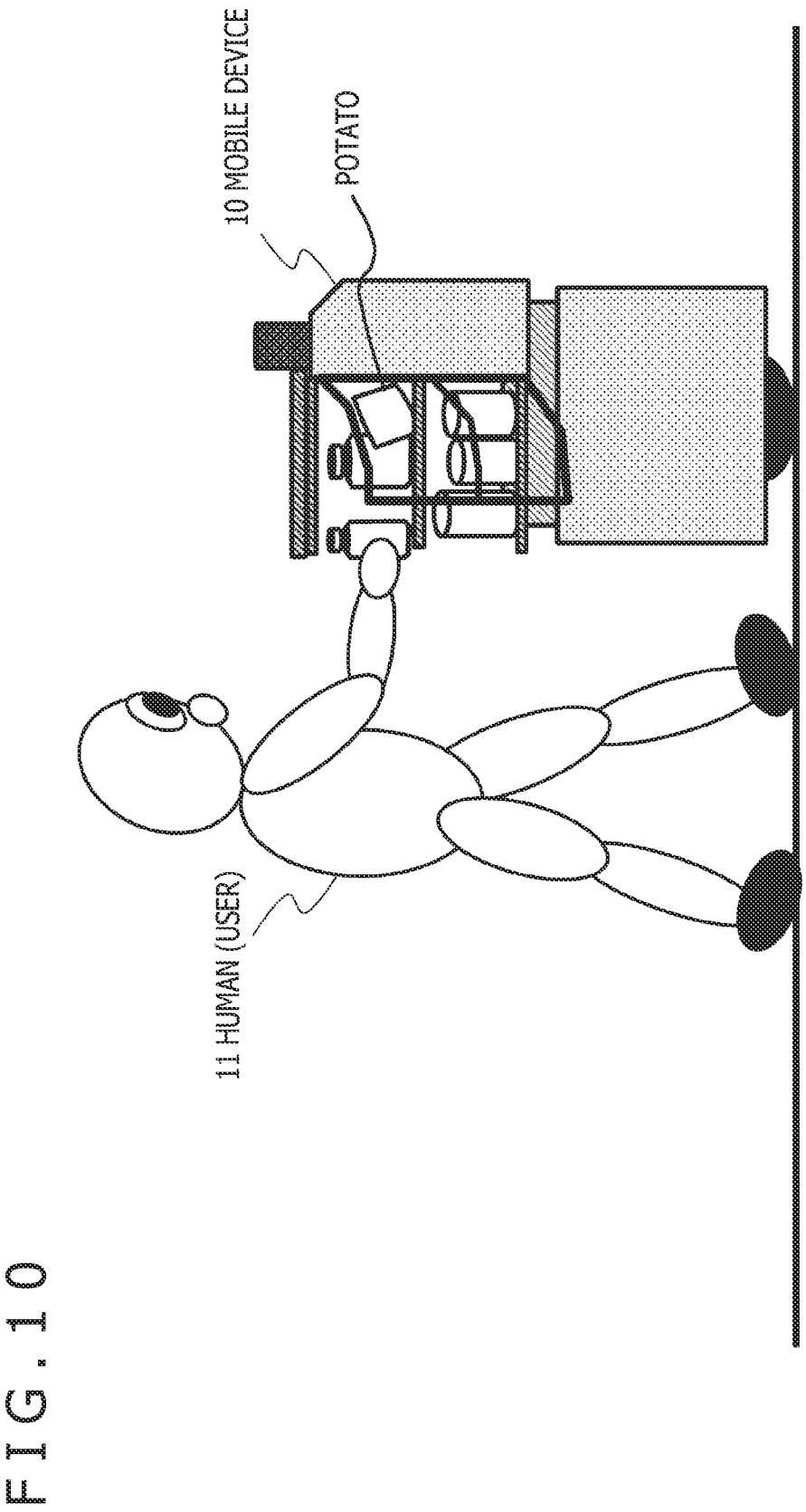
FIG. 10 is a diagram of assistance in explaining processing in a case where the mobile device approaches a human.

A concrete example when this product sales processing is performed is illustrated in FIG. 10.

As illustrated in FIG. 10, the human (user) 11 takes out a product from the product rack of the mobile device 10. A sensor is installed within the mobile device 10. It is therefore possible to identify which product is taken out.

The human (user) 11 can perform a checkout by inserting a coin into the coin insertion unit 35 of the mobile device 10 or bringing the IC card of the user close to the IC card reader-writer 34.

(Step S153)

Step S153 is a step of determining whether or not product selling is ended. For example, when the taking out of the product and the checkout are completed, the mobile device 10 closes the opening and closing door of the product rack and ends the product selling.

When the product selling is ended, the processing proceeds to step S154.

(Step S154)

Ending the product selling in step S153, the mobile device 10 proceeds to step S154, where the mobile device 10 returns to the specified traveling route, and resumes traveling.

Thus, the mobile device 10 according to the present disclosure identifies whether an object approaching the mobile device 10 is a human or not a human, and stops after changing the orientation of the mobile device 10 so as to display the products to the human in a case where the object approaching the mobile device 10 is a human. In a case where the approaching object is not a human, on the other hand, the mobile device 10 performs traveling control for avoiding collision with the object, that is, traveling control for stopping, backing, changing the traveling direction, or the like.

These pieces of processing make it possible to travel safely while avoiding collision with a human or another object, and further efficiently sell a product to a human.

[5. Traveling Control of Mobile Device with Noise Taken into Consideration]

Description will next include an embodiment in which the mobile device 10 performs traveling control with noise taken into consideration when the mobile device 10 travels.

The mobile device 10 generates noise accompanying traveling. The mobile device 10, for example, travels in a building or an office. However, in a case where a conference is performed in a conference room within the building, for example, loud noise accompanying the traveling of the mobile device 10 becomes a nuisance.

The higher the speed of traveling, the louder the noise accompanying the traveling of the mobile device 10. In addition, the noise accompanying the traveling of the mobile device 10 differs according to the material of the traveling surface. For example, the noise is small in a case where the mobile device 10 travels on a carpet, whereas the noise tends to be louder in a case where the mobile device 10 travels on the traveling surface of a hard member such as a floor of stone.

The building management server 130 as a management server of the building in which the mobile device 10 travels has conference conditions of conference rooms in the building, material information of a floor in each position on each floor of the building, or the like, and retains, in the storage unit, an "allowable noise record map" in which allowable noise information in each position unit associated with each position on a map of the building is recorded on the basis of these pieces of information.

According to the "allowable noise record map" retained by the building management server 130, the mobile device 10 performs traveling control such that noise equal to or more than allowable noise does not occur, or specifically performs control of the traveling speed and selection of a traveling route.

Figure 11:
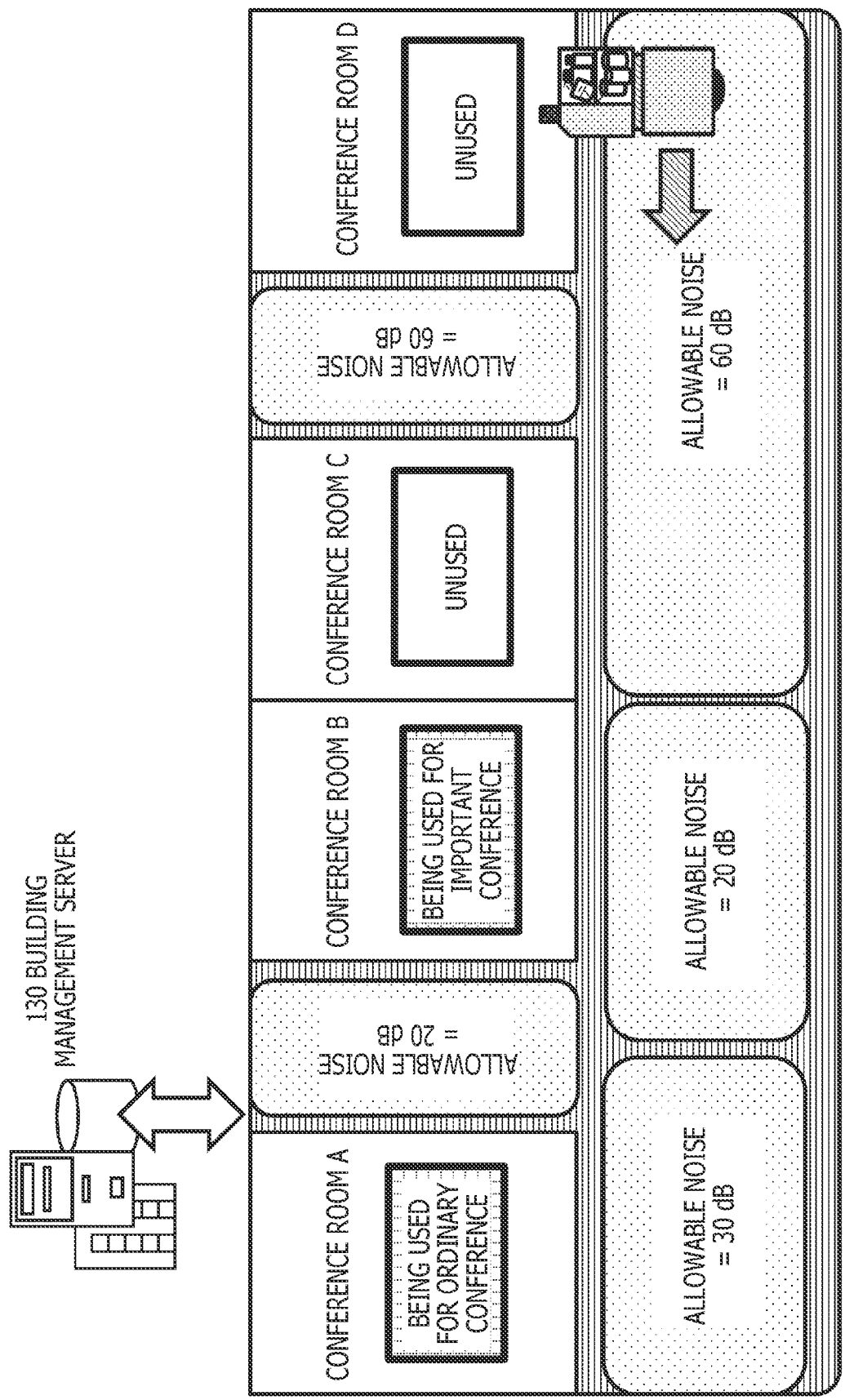
FIG. 11 is a diagram of assistance in explaining an example of an "allowable noise record map" retained by a building management server.

A concrete example of the "allowable noise record map" retained by the building management server 130 is illustrated in FIG. 11.

FIG. 11 is a diagram illustrating an example of a part of the "allowable noise record map" retained by the building management server 130.

FIG. 11 illustrates a partial configuration of one floor within the building. A setting is made such that there are four conference rooms A to D and the mobile device 10 travels through a passage on the outside of the conference rooms A to D.

The usage conditions of the conference rooms A to D are managed by the building management server 130. The building management server 130 sequentially updates the "allowable noise record map" according to the usage states of the conference rooms.

In the example illustrated in FIG. 11, the conference room usage states are as follows,
the conference room A is being used for an ordinary conference,
the conference room B is being used for an important conference, and
the conference rooms C and D are unused.

The building management server 130 generates the "allowable noise record map" as illustrated in the figure according to these conference room usage states.

The allowable noise at times of passing in the vicinity of the unused conference rooms C and D is 60 dB, and thus a relatively loud noise is allowed.

On the other hand, the allowable noise at times of passing in the vicinity of the conference room A being used for an ordinary conference is 30 dB, and thus the allowable noise is set low.

Further, the allowable noise at times of passing in the vicinity of the conference room B being used for an important conference is 20 dB, and thus the allowable noise is set even lower.

The mobile device 10 obtains this "allowable noise record map" from the building management server 130, and travels after setting a speed so as not to exceed the allowable noise specified on this map. In addition, in a case where a selection of a traveling route is possible, the mobile device 10 makes a traveling route setting by selecting a route with a highest possible allowable noise.

Figure 12:
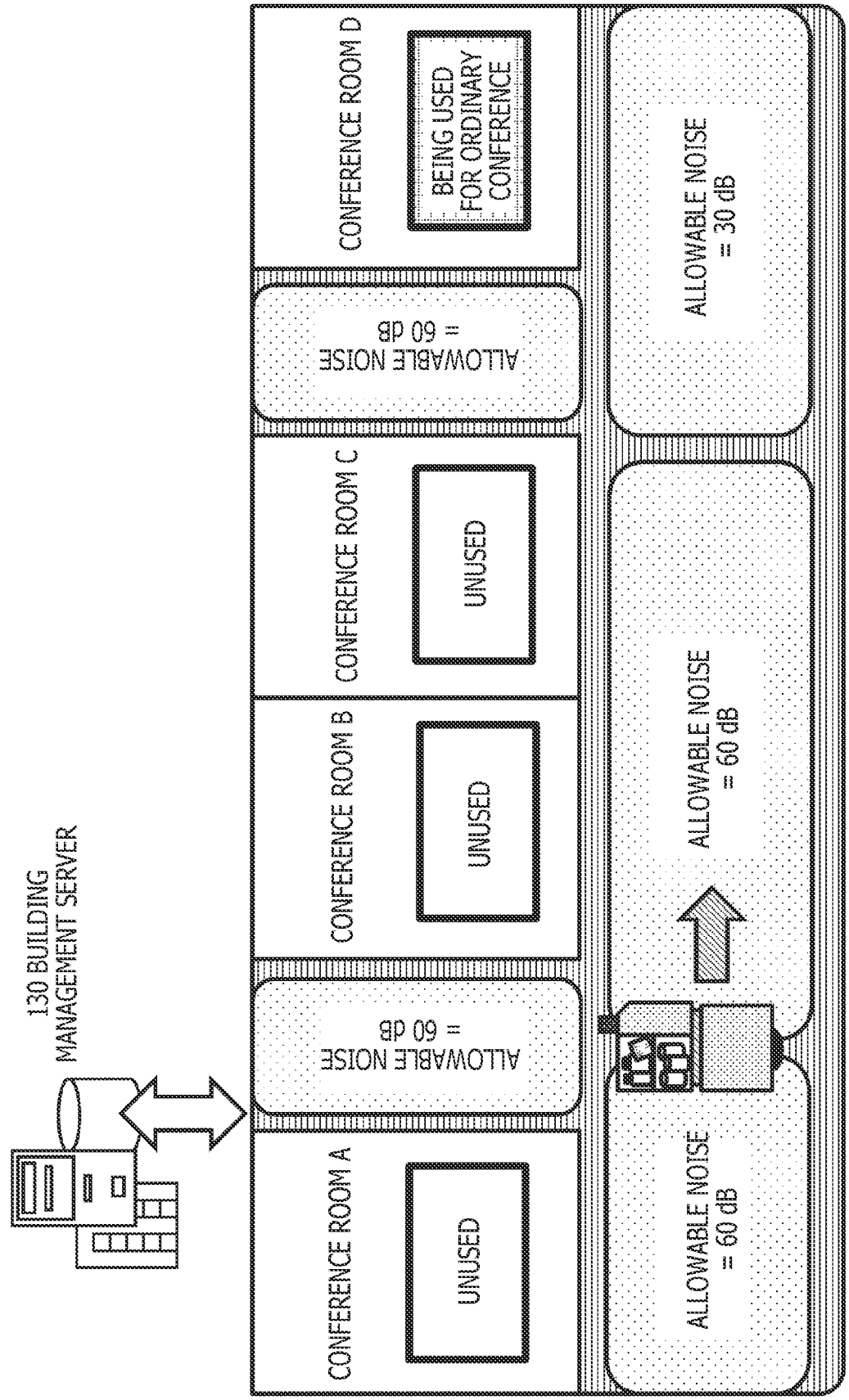
FIG. 12 is a diagram of assistance in explaining an example of the "allowable noise record map" retained by the building management server.

As described earlier, the building management server 130 sequentially updates the "allowable noise record map" according to the conference room usage states. FIG. 12 illustrates an example of the map after an update in which example the usage states of the conference rooms are changed.

In the example illustrated in FIG. 12, the conference room usage states are as follows,
the conference rooms A to C are unused, and
only the conference room D is being used for an ordinary conference.

In a case where the conference room usage states are changed as illustrated in FIG. 12, the building management server 130 updates the "allowable noise record map" as illustrated in FIG. 12.

On the map illustrated in FIG. 12, the allowable noise at times of passing in the vicinity of the unused conference rooms A to C is set to 60 dB, and the allowable noise at times of passing in the vicinity of the conference room D being used for an ordinary conference is changed to be set at 30 dB.

The mobile device 10 obtains the "allowable noise record map" updated sequentially from the building management server 130, and travels after setting a speed so as not to exceed the allowable noise specified on the latest map. In addition, in a case where a selection of a traveling route is possible, the mobile device 10 makes a traveling route setting by selecting a route with a highest possible allowable noise.

Incidentally, the route on which the mobile device 10 travels may include a traveling region for which such an "allowable noise record map" is not generated.

Figure 13:
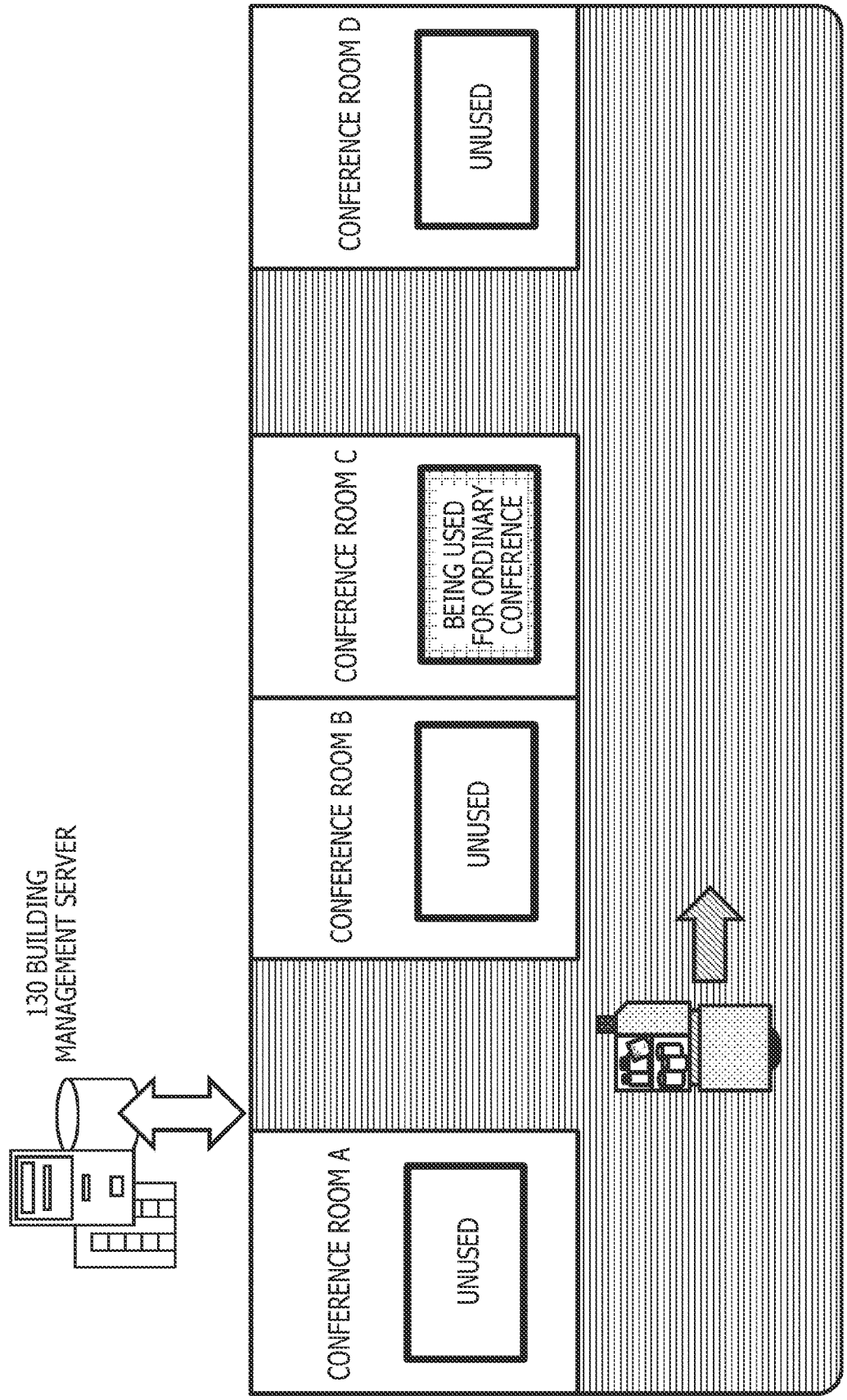
FIG. 13 is a diagram of assistance in explaining an example of a "conference room management map" retained by the building management server.

For example, as illustrated in FIG. 13, the building management server 130 may retain only a "conference room management map" for managing only the usage conditions of conference rooms without allowable noise levels being recorded on the map. Alternatively, there may be a region for which neither the usage conditions of conference rooms nor allowable noise levels are recorded.

The building management server 130 measures noises corresponding to the kinds and characteristics of traveling surfaces and traveling speeds in advance, and retains this measurement information as "traveling surface corresponding noise information" in the storage unit so that the mobile device 10 does not produce excessive noise and can travel with an appropriate noise even in a traveling region for which the "allowable noise record map" as illustrated in FIG. 11 and FIG. 12 described earlier is not generated.

FIG. 14 illustrates a concrete example of the "traveling surface corresponding noise information" retained by the building management server 130.

As illustrated in FIG. 14, the "traveling surface corresponding noise information" includes these pieces of correspondence data,
(a) traveling surface characteristics (images and materials),
(b) speeds, and
(c) noise levels.

An ID is set to each of these pieces of correspondence data.

For example, an entry with an ID=101 indicates that
a noise measured is 30 dB in a case where the traveling surface of the mobile device 10 is a carpet and the traveling speed of the mobile device 10 is a high speed (5 m/s). This value is data obtained by an actual traveling test. Incidentally, images of traveling surfaces and material information are registered as (a) traveling surface characteristics (images and materials).

Entries with ID 102 and the following IDs illustrated in the following are also data in which (a) traveling surface characteristics (images and materials) of respective traveling surfaces, (b) speeds (high speed (5 m/s), medium speed (3 m/s), and low speed (1 m/s)), and (c) noise levels are associated with one another.

The building management server 130 retains such "traveling surface corresponding noise information" in the storage unit. In a case where the mobile device 10 travels in a region for which the "allowable noise record map" described earlier with reference to FIG. 11 and FIG. 12 is not generated, the mobile device 10 obtains this "traveling surface corresponding noise information," determines a kind of traveling surface (manufactured of a carpet, a stone, wood, or the like) from a camera photographed image of an actual traveling surface, estimates a noise level that will occur according to a determination result, and travels after determining a traveling speed according to the estimated noise level.

Incidentally, the building management server 130 further retains "room corresponding allowable noise information" as illustrated in FIG. 15, for example, as allowable noise level information corresponding to the usage conditions of the conference rooms. The "room corresponding allowable noise information" is data in which allowable noise levels corresponding to the usage conditions of the conference rooms are recorded, as illustrated in FIG. 15.

The building management server 130 retains the "room corresponding allowable noise information" as follows, for example, in the storage unit, an allowable noise level for an unused conference room is 60 dB,
an allowable noise level for a conference room in which an ordinary conference is being held is 40 dB, and
an allowable noise level for a conference room in which an important conference is being held is 20 dB.

When the mobile device 10 travels in a traveling region for which the "allowable noise record map" described earlier with reference to FIG. 11 and FIG. 12 is not generated, that is, a region as illustrated in FIG. 13, the mobile device 10 obtains the "traveling surface corresponding noise information" described with reference to FIG. 14 and the "room corresponding allowable noise information," and controls the traveling speed or the like so as to travel at an allowable noise level or lower.

A sequence of traveling processing involving noise control performed by the mobile device 10 will next be described with reference to a flowchart illustrated in FIG. 16.

Figure 16:
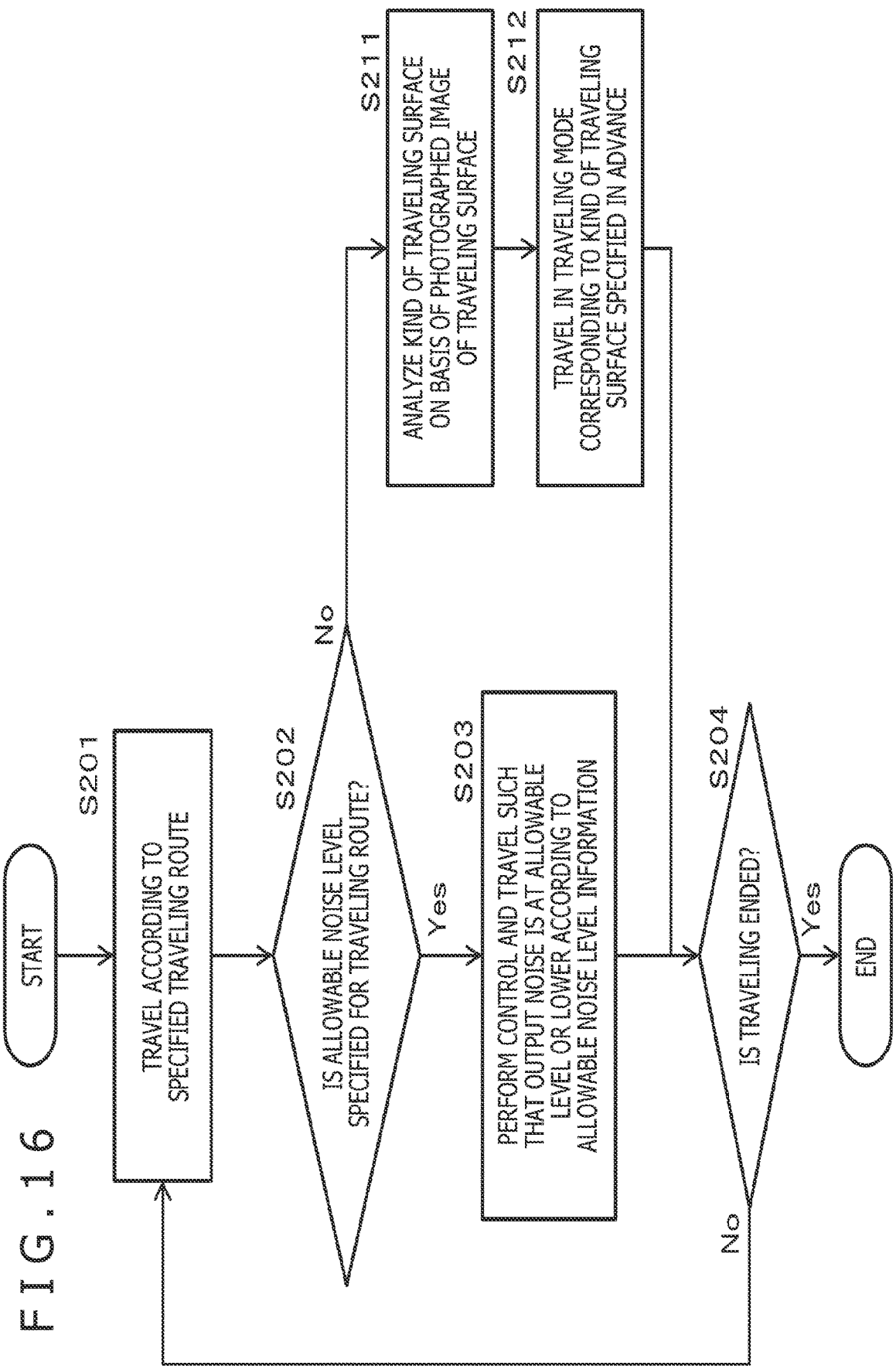
FIG. 16 is a diagram illustrating a flowchart of assistance in explaining a sequence of traveling processing involving noise control performed by the mobile device.

Processing according to the flowchart illustrated in FIG. 16 can be performed by the control unit (data processing unit) of the mobile device 10, for example, according to a program stored in the storage unit of the mobile device 10. The processing according to the flowchart illustrated in FIG. 16 can, for example, be performed as program execution processing by a processor such as a CPU having a program executing function.

The processing of each step in a flow illustrated in FIG. 16 will be described in the following.

(Step S201)

First, in step S201, the mobile device 10 travels according to a specified traveling route.

In a case where there is a call from the user, for example, the mobile device 10 travels according to a route with the position of the calling user as a destination. In addition, in a case where no destination is set, the mobile device 10 travels according to a specified circuit route.

(Step S202)

Next, in step S202, the mobile device 10 determines whether or not the present traveling route is a route for which an allowable noise level is specified. That is, the mobile device 10 determines whether or not the present traveling route is a traveling route for which the "allowable noise record map" described earlier with reference to FIG. 11 and FIG. 12 is generated.

In a case where the present traveling route is a traveling route for which the "allowable noise record map" is generated, the processing proceeds to step S203.

In a case where the present traveling route is a traveling route for which the "allowable noise record map" is not generated, on the other hand, the processing proceeds to step S211.

(Step S203)

In a case where the present traveling route is a traveling route for which the "allowable noise record map" is generated in the determination processing of step S202, the processing proceeds to step S203.

In step S203, the mobile device 10 obtains the "allowable noise record map" retained by the building management server 130, refers to this map, and sets a traveling speed and travels so as not to exceed the allowable noise level specified on the map. In addition, in a case where a plurality of traveling routes is selectable, control of changing the traveling route so as to select a route with a high allowable noise level or the like may be performed.

(Step S211)

In a case where the present traveling route is a traveling route for which the "allowable noise record map" is not generated in the determination processing of step S202, on the other hand, the processing proceeds to step S211.

In step S211, the mobile device 10 photographs an image of the traveling surface by a camera and estimates the kind of the traveling surface on the basis of the photographed image. For example, an estimation is performed as to whether the traveling surface is a carpet, stone, wood, or the like.

Processing using learning data for analysis, the learning data being stored in the storage unit, for example, may be performed in analysis processing of the kind of the traveling surface on the basis of the image of the traveling surface, the analysis processing being performed by the control unit of the mobile device 10.

(Step S212)

Next, in step S212, the mobile device 10 obtains the "traveling surface corresponding noise information" and the "room corresponding allowable noise information" retained by the building management server 130.

Further, the kind of the traveling surface which kind is estimated in step S211 is checked against the "traveling surface corresponding noise information," and what degree of noise occurs at which traveling speed is determined.

Further, a noise level allowed in the planned traveling route is obtained on the basis of the "room corresponding allowable noise information."

Traveling is performed while the speed of the mobile device 10 is controlled so as to produce a noise at the noise level allowed on the planned traveling route or lower on the basis of these pieces of information.

(Step S204)

In step S204, the mobile device 10 determines whether or not to end the traveling. In a case where the traveling is not to be ended, the processing returns to step S201 to continue the traveling according to the specified traveling route. In a case where the traveling is to be ended, the processing is ended.

Thus, in a case where a specified allowable noise level is specified within the traveling route, the mobile device 10 according to the present disclosure refers to the allowable noise information, performs processing such as control of the traveling speed, or changing of the traveling route, and performs traveling.

This processing realizes traveling that does not cause a nuisance to the surroundings.

Incidentally, as described earlier, the building management server 130 measures noises corresponding to kinds and characteristics of traveling surfaces and traveling speeds in advance, and generates this measurement information, that is, the "traveling surface corresponding noise information" as illustrated in FIG. 14, and retains the "traveling surface corresponding noise information" in the storage unit, in order for the mobile device 10 not to produce excessive noise and to be able to travel with an appropriate noise even in a traveling region for which the "allowable noise record map" as illustrated in FIG. 11 and FIG. 12 described earlier is not generated.

When this "traveling surface corresponding noise information" is generated, processing is performed which makes the mobile device 10 actually travel on various traveling surfaces and analyzes the noises. A sequence of this processing will be described with reference to a flowchart illustrated in FIG. 17.

The processing of each step in a flow illustrated in FIG. 17 will be described in order.

(Step S301)

First, in step S301, the mobile device 10 travels according to a specified traveling route.

There are traveling surfaces of various materials on this specified traveling route.

(Step S302)

The mobile device 10 obtains pieces of information including a traveling position, a traveling speed, noise, and traveling surface characteristic information as needed while traveling, and stores these pieces of information in the storage unit or transmits these pieces of information to the building management server 130.

The traveling surface characteristic information includes an image of the traveling surface photographed by a camera.

(Step S303)

Next, in step S303, the mobile device 10 generates data in which measured noise information corresponding to the position, the traveling surface, and the traveling speed is recorded, or what is called "traveling surface corresponding noise information" described earlier with reference to FIG. 14, on the basis of the obtained pieces of information including the traveling position, the traveling speed, the noise, and the traveling surface characteristic information.

(Step S304)

Step S304 determines whether or not all of data corresponding to planned traveling speeds is obtained.

In a case where the obtainment of all of the data is not completed, the processing from step S301 on down is repeated in order to obtain unobtained data.

In a case where the obtainment of all of the data is completed, the processing is ended.

Figure 17:
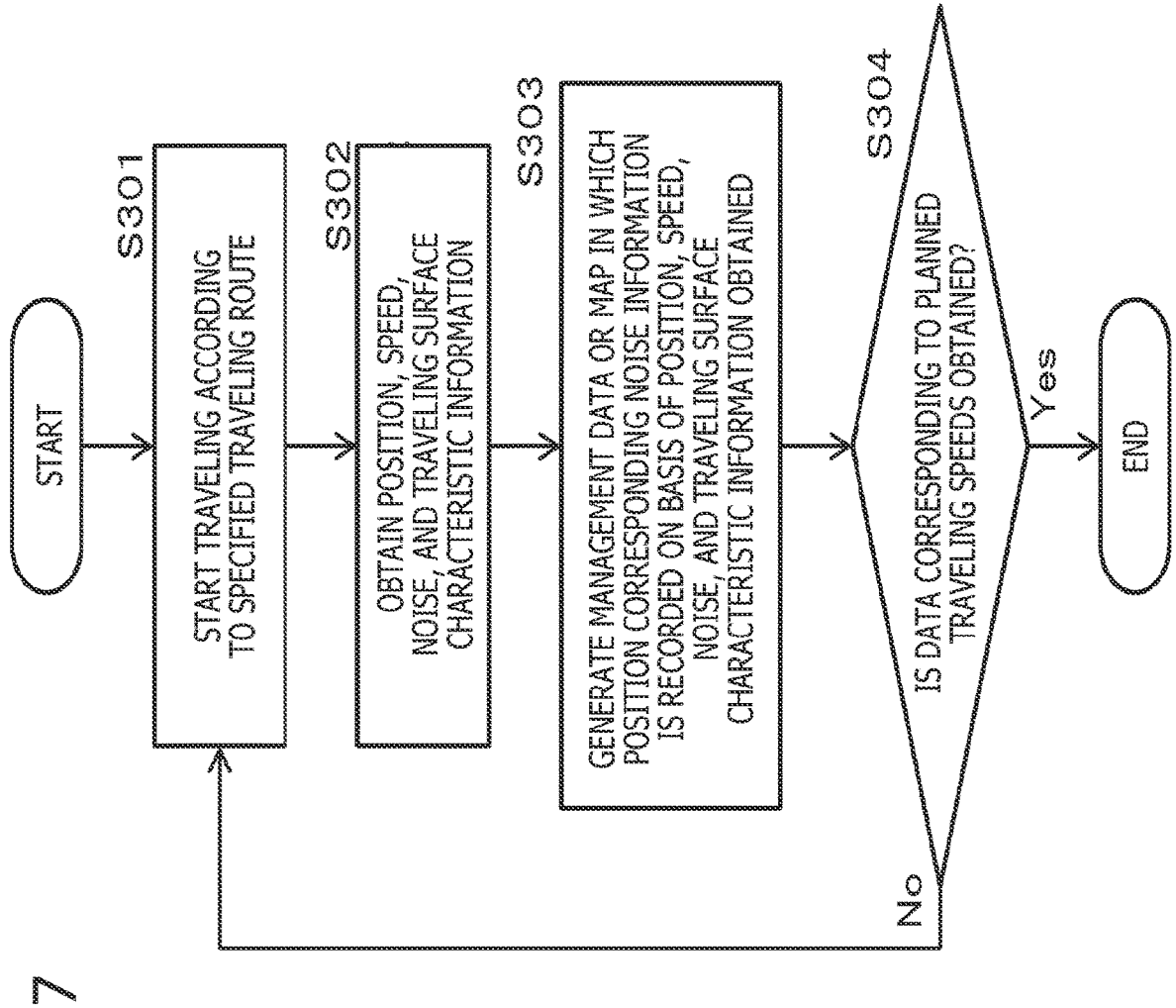
FIG. 17 is a diagram illustrating a flowchart of assistance in explaining a sequence of processing performed in noise measuring processing performed by the mobile device to generate the "traveling surface corresponding noise information."

FIG. 18 illustrates an example of data generated by the traveling processing according to the flow illustrated in FIG. 17. The data illustrated in FIG. 18 is substantially similar data to the "traveling surface corresponding noise information" illustrated in FIG. 14 described earlier. The data illustrated in FIG. 18 includes the following data associated with IDs.

(1) positions (coordinates) and position identification information (conference room information or the like)
(2) traveling surface characteristics (images and materials)
(3) speeds
(4) noise levels The data illustrated in FIG. 18 includes these pieces of correspondence data.

An ID is set to each of these pieces of correspondence data.

The "traveling surface corresponding noise information" illustrated in FIG. 14 described earlier is generated on the basis of the measurement data illustrated in FIG. 18.

[6. Example of Traveling Processing of Mobile Device on Basis of Cooperation between Mobile Device and Building Management Server]

Next, description will include an example of processing for traveling while the mobile device 10 and the building management server 130 cooperate with each other when the mobile device 10 moves within a building.

In a case where the mobile device 10 moves in an office within a certain building, for example, the mobile device 10 moves between floors by using an elevator in the building. In addition, it is necessary to pass through a security door provided at each place within the building.

In such a case, the mobile device 10 communicates with the building management server 130 and makes a request to board and leave the elevator or open and close the security door to the building management server 130.

In response to the request from the mobile device 10, the building management server 130 controls the elevator or the security door so that the mobile device 10 can move within the building smoothly.

A concrete example of this processing will be described in the following.

Figure 19:
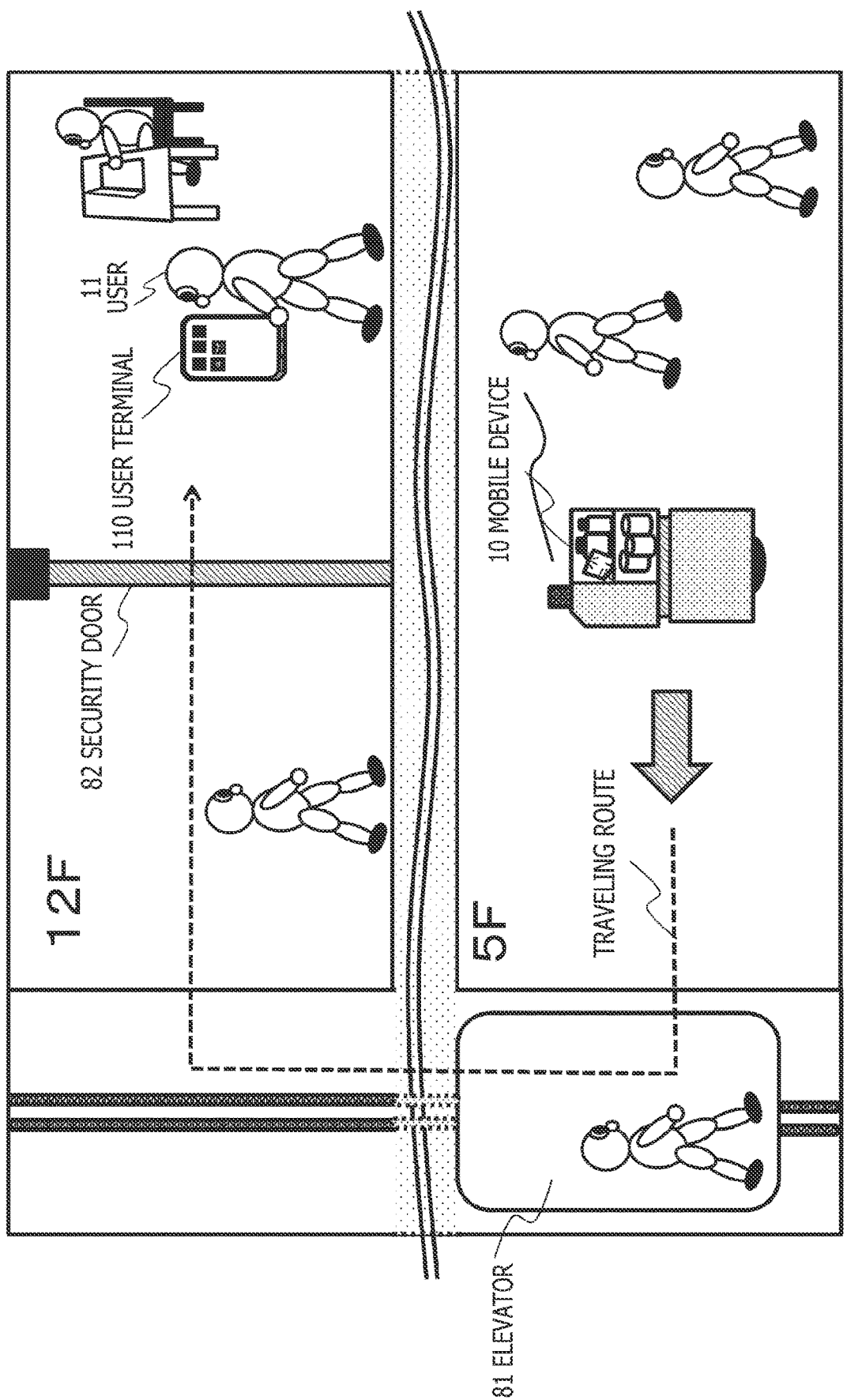
FIG. 19 is a diagram illustrating an example in which the mobile device moves in an office within a certain building.

FIG. 19 is a diagram illustrating an example in which the mobile device 10 moves in an office within a certain building.

The mobile device 10 is now traveling on a fifth floor (5F). Suppose that at this time, a user 11 on a 12th floor (12F) calls the mobile device 10 by using a user terminal 110.

The call request from the user terminal 110 is once transmitted to the mobile device management server 120, and the mobile device management server 120 transmits a movement instruction to move with the position of the user 11 as a destination to the mobile device 10.

In response to the movement instruction from the mobile device management server 120, the mobile device 10 sets a traveling route with the position of the user 11 on the 12th floor as a destination and starts traveling.

However, in order to arrive at the destination (user 11) by traveling on this traveling route, it is necessary to use an elevator 81, and pass through a security door 82.

In order to perform this traveling smoothly, the mobile device 10 communicates with the building management server 130 and makes requests to board and leave the elevator and open and close the security door to the building management server 130.

A communication and processing sequence in a case of traveling according to the traveling route illustrated in FIG. 19 will be described with reference to a sequence diagram illustrated in FIGS. 20 to 22.

Figure 20:
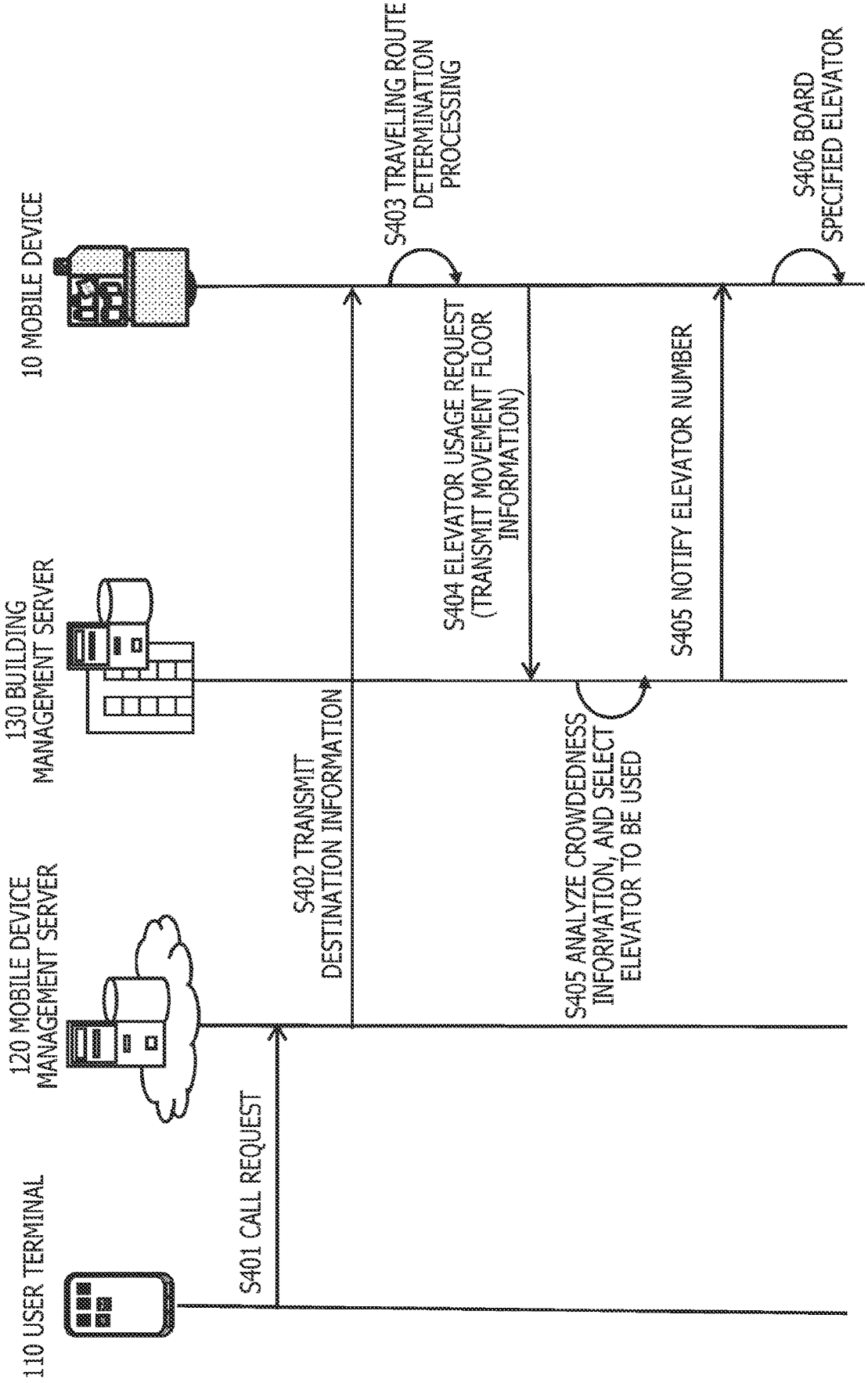
FIG. 20 is a diagram of assistance in explaining a communication and processing sequence in a case where the mobile device moves in the office within the certain building.
Figure 21:
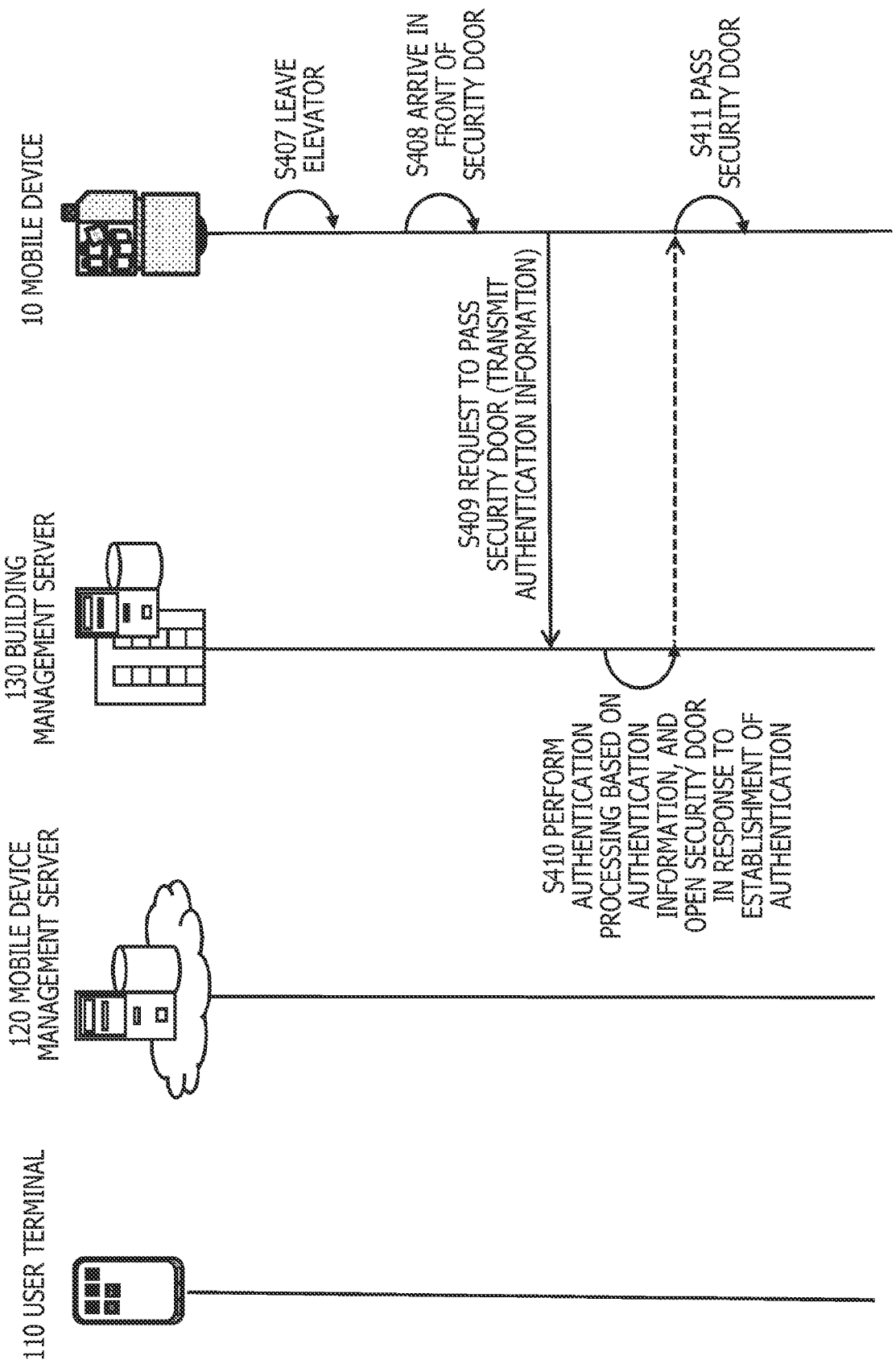
FIG. 21 is a diagram of assistance in explaining a communication and processing sequence in the case where the mobile device moves in the office within the certain building.
Figure 22:
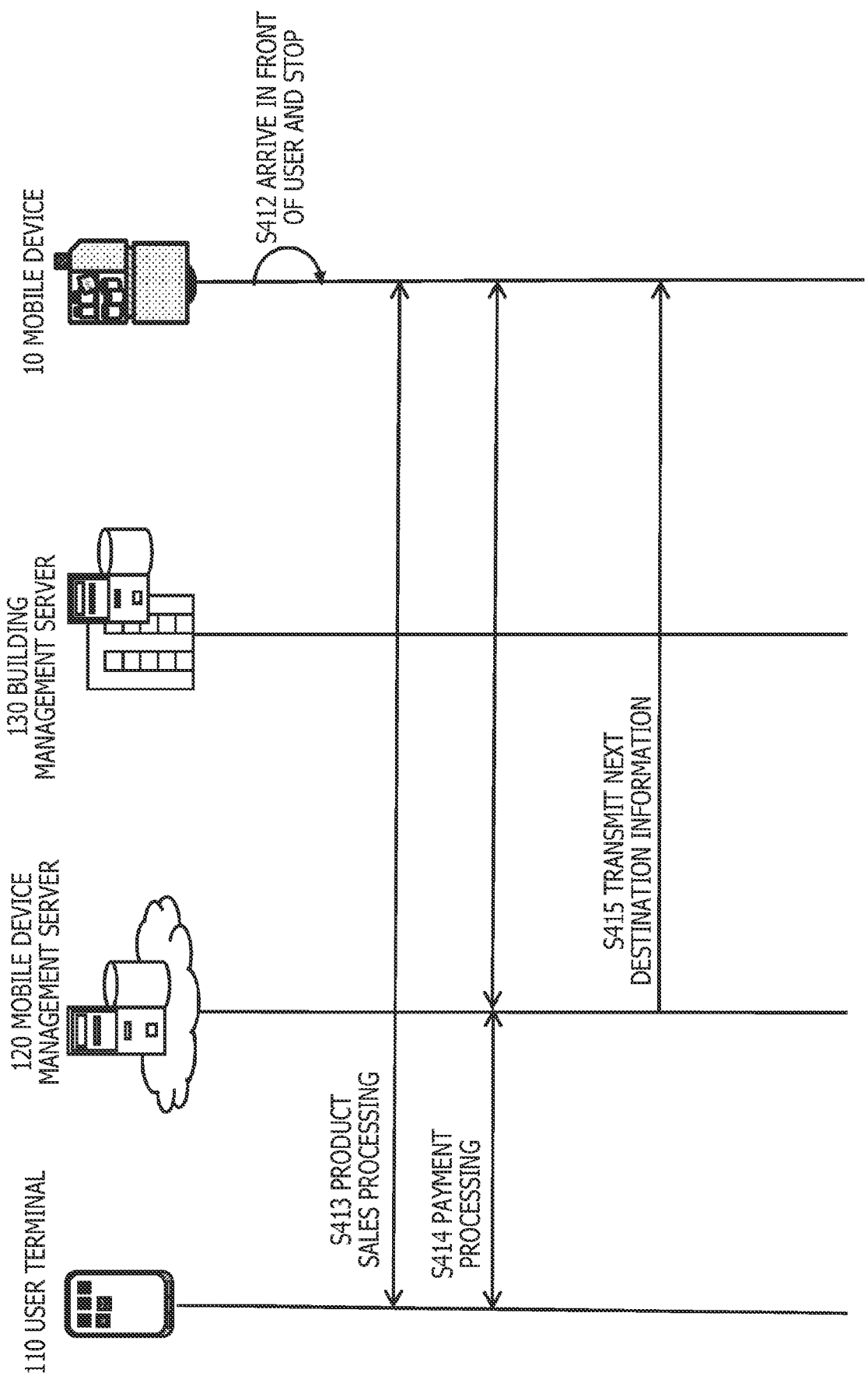
FIG. 22 is a diagram of assistance in explaining a communication and processing sequence in the case where the mobile device moves in the office within the certain building.

The sequence diagram illustrated in FIGS. 20 to 22 illustrates, from the left, the user terminal 110, the mobile device management server 120, the building management server 130, and the mobile device 10.

Various communications and processing are performed between these four devices.

The processing of each step of the sequence diagram illustrated in FIGS. 20 to 22 will be described in the following.

(Step S401)

First, the user 11 calls the mobile device 10 by using the user terminal 110.

A call request from the user terminal 110 is transmitted to the mobile device management server 120. Incidentally, the call request from the user terminal 110 includes positional information of the user terminal 110.

(Step S402)

When the mobile device management server 120 receives the call request from the user terminal 110, the mobile device management server 120 in step S402 transmits a movement instruction having the position of the user terminal as a destination to the mobile device 10 on the basis of the positional information of the user terminal which positional information is included in the call request from the user terminal 110.

(Step S403)

Next, receiving the destination information from the mobile device management server 120, the mobile device 10 in step S403 determines a traveling route from the present position of the mobile device 10 to the destination (the position of the user terminal that performed the calling).

(Step S404)

Next, the mobile device 10 transmits an elevator usage request to the building management server 130 on the basis of inclusion of an elevator usage route in the traveling route determined in step S403. A mobile device identifier as well as movement floor information, that is, information regarding floors on which an elevator is to be boarded and left is stored in the elevator usage request, and the elevator usage request is transmitted.

(Step S405)

When the building management server 130 receives the elevator usage request from the mobile device 10, the building management server 130 in step S405 analyzes the usage conditions of a plurality of elevators within the building, and selects one elevator as an elevator to be used by the mobile device 10.

The selected elevator is, for example, temporarily set as an elevator for exclusive use by the mobile device 10, so that the usage of the elevator by ordinary users is restricted. This is processing for preventing the occurrence of a situation in which the mobile device 10 cannot board the elevator because there are many users using the elevator when the mobile device 10 intends to board the elevator.

The building management server 130 notifies an identifier (elevator number) of the selected elevator to the mobile device 10.

(Step S406)

Notified of the identifier (elevator number) of the elevator from the building management server 130, the mobile device 10 boards the specified elevator in step S406.

The elevator is temporarily set as an elevator for exclusive use by the mobile device 10, so that the usage of the elevator by ordinary users is restricted. Thus, the mobile device 10 can surely board the elevator.

Incidentally, in a case where there is an ordinary user within the elevator, the control unit of the mobile device 10 performs control of stopping the selling of the products mounted in the mobile device 10. This is based on a reason that a time to stay within the elevator is limited, and therefore the checkout processing or the like may not be completed, for example.

(Step S407)

Next, after boarding the elevator, the mobile device 10 in step S407 arrives at a floor where the destination (the position of the user terminal that performed the calling) is located and leaves the elevator.

(Step S408)

Next, the mobile device 10 in step S408 arrives in front of a security door.

(Step S409)

After arriving in front of the security door, the mobile device 10 in step S409 transmits a security door passing request to the building management server 130 so that the security door is opened and the mobile device 10 can pass through the security door. This passing request transmission packet stores the ID of the mobile device 10 and authentication information registered in advance.

(Step S410)

Receiving the security door passing request from the mobile device 10, the building management server 130 performs authentication processing of the mobile device 10 on the basis of the ID of the mobile device 10 and the authentication information registered in advance, the ID and the authentication information being stored in the received packet, and thereby determines whether or not the mobile device 10 has a right to pass through the security door. In a case where the passing right is recognized as a result of the determination processing, the security door is opened.

(Step S411)

When the security door is opened under control of the building management server 130, the mobile device 10 in step S411 passes through the security door.

(Step S412)

After passing through the security door, the mobile device 10 in step S412 arrives in front of the user 11 who performed the calling and stops.

(Steps S413 and S414)

The mobile device 10 performs product sales processing in step S413 and performs payment processing in step S414. The mobile device 10 identifies a product taken out by the user 11, and further performs the payment processing or the like by performing communication with the mobile device management server 120 or the like.

This product sales processing is processing described earlier with reference to FIG. 11.

As illustrated in FIG. 11, the human (user) 11 takes out a discommodity from the product rack of the mobile device 10. A sensor is installed within the mobile device 10. It is therefore possible to identify which product is taken out.

The human (user) 11 can perform a checkout by inserting a coin into the coin insertion unit 35 of the mobile device 10 or bringing the IC card of the user close to the IC card reader-writer 34.

When the checkout is completed, the mobile device 10 closes the opening and closing door of the product rack and ends the product selling.

When the product selling is ended, the processing proceeds to step S415.

(Step S415)

In step S415, the mobile device management server 120 transmits next destination information to the mobile device 10. The mobile device 10 generates a traveling route to the next destination and starts traveling.

Incidentally, the present location information of the mobile device 10 is sequentially transmitted to the mobile device management server 120, and thus the mobile device management server 120 grasps the present location of the mobile device 10 at all times.

Thus, in a case where the elevator and the security door managed by the building management server 130 are present on the traveling route on which the mobile device 10 travels, the mobile device 10 according to the present disclosure makes a usage request and a passing request by communicating with the building management server 130 in order to use the elevator and pass through the security door smoothly.

In order to realize smooth traveling in response to the requests of the mobile device 10, the building management server 130 performs selection of the elevator and opening and closing processing of the security door.

These pieces of mutual processing enable the mobile device 10 to travel to the destination promptly.

Figure 23:
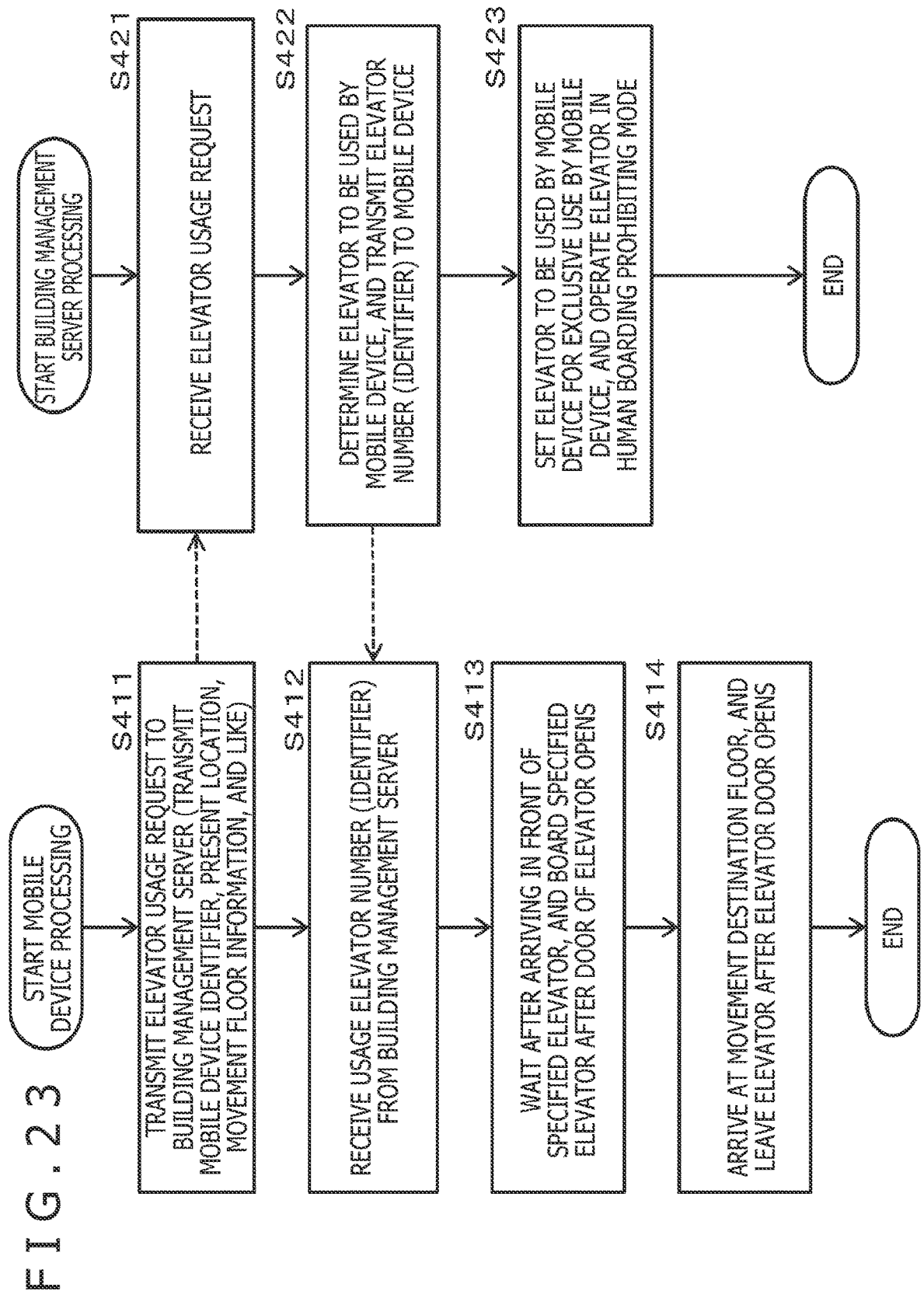
FIG. 23 is a diagram illustrating a flowchart of assistance in explaining a detailed sequence of the mobile device and the building management server which sequence is performed at a time of elevator usage processing.
Figure 24:
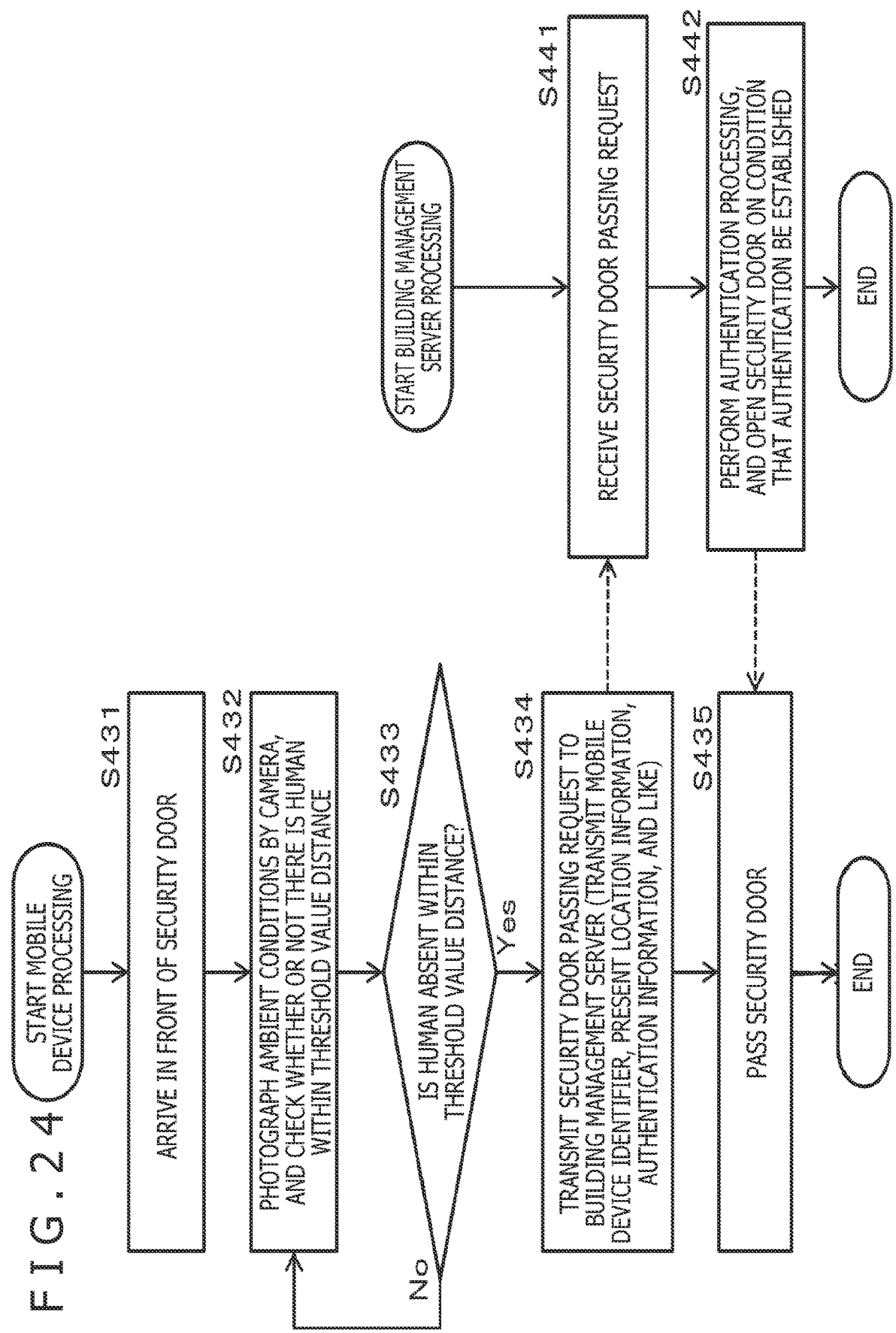
FIG. 24 is a diagram illustrating a flowchart of assistance in explaining a detailed sequence of the mobile device and the building management server which sequence is performed at a time of passage through a security door.

Next, referring to a flowchart illustrated in FIG. 23 and FIG. 24, description will include a detailed sequence of the mobile device 10 and the building management server 130 which sequence is performed at times of elevator usage processing and security door passage processing.

First, referring to FIG. 23, description will include a detailed sequence of the mobile device 10 and the building management server 130 which sequence is performed at a time of elevator usage processing. FIG. 23 illustrates processing of the mobile device 10 on a left side and the processing sequence of the building management server 130 on a right side.

The processing of each step will be described in the following.

(Step S411)

First, the mobile device 10 in step S411 transmits an elevator usage request to the building management server 130. A mobile device identifier as well as movement floor information, that is, information regarding floors on which an elevator is to be boarded and left is stored in the elevator usage request, and the elevator usage request is transmitted.

(Step S421)

The processing of step S421 is processing of the building management server 130.

The building management server 130 in step S421 receives the elevator usage request from the mobile device 10.

(Step S422)

The processing of next step S422 is also processing of the building management server 130.

The building management server 130 in step S422 analyzes the usage conditions of the plurality of elevators within the building, selects one elevator as an elevator to be used by the mobile device 10, and notifies the identifier (elevator number) of the selected elevator to the mobile device 10.

Incidentally, as described earlier, the building management server 130 selects the elevator to be temporarily set as an elevator for exclusive use by the mobile device 10, and notifies the identifier (elevator number) of the elevator to the mobile device 10.

(Step S412)

The processing of steps S412 to S414 is processing performed by the mobile device 10.

The mobile device 10 in step S412 receives the identifier (elevator number) of the elevator from the building management server 130.

(Step S413)

Next, the mobile device 10 in step S413 arrives in front of the designated elevator and boards the elevator after the door of the designated elevator opens.

The elevator is temporarily set as an elevator for exclusive use by the mobile device 10, so that the usage of the elevator by ordinary users is restricted. Thus, the mobile device 10 can surely board the elevator.

Incidentally, this elevator is under control of the building management server 130, and stop processing and door opening processing on the boarding and leaving floors received from the mobile device 10 are performed by the control of the building management server 130.

(Step S414)

Next, in step S414, the elevator arrives at the designated floor, and the door of the elevator is opened.

These controls are all performed by the building management server 130. After the door of the elevator opens, the mobile device 10 leaves the elevator, and starts traveling on the floor where the destination is present.

Next, referring to FIG. 24, description will include a detailed sequence of the mobile device 10 and the building management server 130 which sequence is performed at a time of security door passage processing. FIG. 24 also illustrates the processing of the mobile device 10 on a left side and the processing sequence of the building management server 130 on a right side.

The processing of each step will be described in the following.

(Step S431)

First, the mobile device 10 in step S431 arrives in front of the security door.

(Steps S432 to S433)

Arriving in front of the security door, the mobile device 10 in step S432 photographs ambient conditions by a camera, and checks whether or not there is a human within a threshold value distance (for example, 1 m) specified in advance from the mobile device 10.

This processing is processing whose description is omitted in the previous sequence diagram.

This processing is processing for excluding a person who tries to enter illegally when the mobile device 10 passes through the security door.

In a case where there is a human within the threshold value distance (for example, 1 m) specified in advance from the mobile device 10 (step S433=No), the processing does not proceed to step S434, but repeats steps S432 and S433.

In a case where it is confirmed that there is no human within the threshold value distance (for example, 1 m) specified in advance from the mobile device 10 (step S433=Yes), the processing proceeds to step S434.

(Step S434)

In the case where it is confirmed that there is no human within the threshold value distance (for example, 1 m) specified in advance from the mobile device 10 (step S433=Yes), the mobile device 10 in step S434 transmits a security door passing request to the building management server 130 so that the security door is opened and the mobile device 10 can pass through the security door. This transmission data stores the ID of the mobile device 10 and authentication information registered in advance.

(Step S441)

The processing of steps S441 to S442 is processing performed by the building management server 130.

In step S441, the building management server 130 receives the security door passing request from the mobile device 10.

(Step S442)

Receiving the security door passing request from the mobile device 10, the building management server 130 in step S442 performs authentication processing of the mobile device 10 on the basis of the ID of the mobile device 10 and the authentication information registered in advance, the ID and the authentication information being stored in a received packet, and thereby determines whether or not the mobile device 10 has a right to pass through the security door. In a case where the passing right is recognized as a result of the determination processing, the security door is opened.
(Step S435)

When the security door is opened under control of the building management server 130, the mobile device 10 in step S435 passes through the security door.

As described with reference to the flowchart illustrated in FIG. 23 and FIG. 24, the mobile device 10 requests control of the elevator and the security door on the traveling route of the mobile device 10 by communicating with the building management server 130, and the building management server 130 performs the control. Smooth traveling of the mobile device 10 is thereby realized.

[7. Example of Hardware Configuration of Mobile Device]

An example of hardware configuration of the mobile device will next be described.

Figure 25:
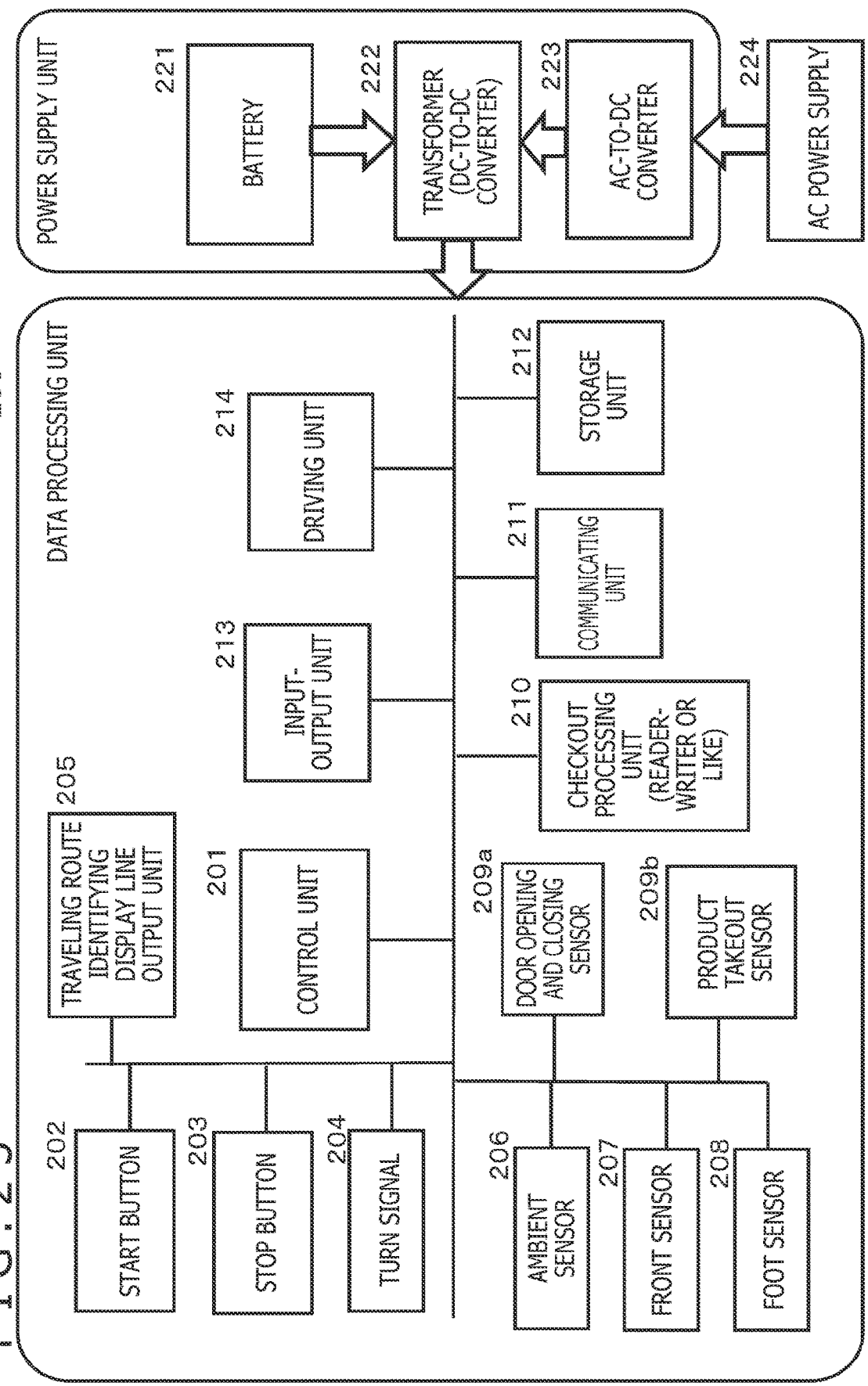
FIG. 25 is a diagram of assistance in explaining an example of hardware configuration of the mobile device.

FIG. 25 is a diagram illustrating an example of hardware configuration of the mobile device 10.

Incidentally, a part of the configuration illustrated in FIG. 25 can be configured as an information processing device detachable from the mobile device 10.

As illustrated in the figure, the mobile device 10 includes a data processing unit 200 and a power supply unit 220.

The data processing unit 200 includes a control unit 201, a start button 202, a stop button 203, a turn signal 204, an ambient sensor 206, a front sensor 207, a foot sensor 208, a door opening and closing sensor 209, a checkout processing unit (reader-writer or the like) 210, a communicating unit 211, a storage unit 212, an input-output unit 213, and a driving unit 214.

For example, of these constituent units, the control unit 201, the communicating unit 211, the storage unit 212, the input-output unit 213, and the like can be configured as an information processing device detachable from the mobile device 10.

The power supply unit 220 includes a battery 221, a transformer (DC-to-DC converter) 222, and an AC-to-DC converter 223.

The transformer (DC-to-DC converter) 222 of the power supply unit 220 converts power input from an AC power supply 224 or the battery 221 into power (DC) of a predetermined voltage suitable for the data processing unit 200, and supplies the power to the data processing unit 200.

The control unit 201 of the data processing unit 200, for example, has a processor such as a CPU having a program executing function. The control unit 201, for example, performs processing according to a program stored in the storage unit 212. Alternatively, the control unit 201 performs processing according to a command or the like transmitted from an external device such as the mobile device management server 120, a user terminal, or a controller, and received via the communicating unit 211.

The control unit 201 specifically performs driving control of the mobile device 10, self-position estimation processing based on sensor detection information, checkout processing, image output control, image analysis processing, object identification processing, and the like. Incidentally, the checkout processing is performed as joint processing with the checkout processing unit 210. The image analysis processing and the object identification processing are, for example, determination processing as to whether or not a proximity object is a human, determination processing as to whether or not the human is oriented full face, and the like. Data necessary for these pieces of determination processing, for example, human pattern data, face pattern data, and the like are stored in the storage unit 212.

The start button 202, the stop button 203, and the turn signal 204 have the configuration described earlier with reference to FIG. 7. The start button 202 and the stop button 203 can start or stop the traveling of the mobile device 10 according to user operation. The turn signal 204 emits light when the mobile device 10 turns right or turns left.

Depression information of the start button 202 and the stop button 203 is input to the control unit 201. The control unit 201 outputs driving control signals to the driving unit 214. The driving unit 214 performs processing of starting and stopping the mobile device 10 or the like on the basis of the driving control signals.

Light emission control of the turn signal 204 is also performed by the control unit 201.

The ambient sensor 206, the front sensor 207, and the foot sensor 208 are the sensors described earlier with reference to FIG. 3.

The ambient sensor 206 is a sensor that detects the conditions of surroundings of the mobile device 10. The ambient sensor 206 is attached to an upper portion of the mobile device 10. Detection information of the ambient sensor 206 is input to the control unit 201 to detect an obstacle in the surroundings and is also used for the self-position estimation processing of the mobile device 10.

The ambient sensor 206 includes, for example, either a lidar (LiDAR: Light Detection and Ranging, Laser Imaging Detection and Ranging) obtaining ambient information using pulsed laser light, an omnidirectional camera capable of photographing entire surroundings, a fish-eye camera, or the like, or a combination thereof.

The front sensor 207 is a sensor that detects conditions in a frontward direction as a traveling direction of the mobile device 10. The front sensor 207 is attached to a middle part position of the front of the mobile device 10.

Detection information of the front sensor 207 is also input to the control unit 201 to detect an obstacle in front.

The front sensor 207 specifically, for example, includes either a ToF (Time of Flight) sensor, a camera, or the like, or a combination thereof.

As with the front sensor 207, the foot sensor 208 is also a sensor that detects conditions in the frontward direction as the traveling direction of the mobile device 10. However, the foot sensor 208 is a sensor that detects mainly an obstacle in a foot position in front of the mobile device 10.

The foot sensor 208 is attached to a position of being able to detect an obstacle in a region as a blind spot of the front sensor 207.

Specifically, the foot sensor 208 is attached to a lower position of the mobile device 10.

The foot sensor 208 specifically, for example, includes either a LiDAR, a distance sensor, a bumper sensor, a camera, or the like, or a combination thereof.

The door opening and closing sensor 209 is a sensor that detects an opened/closed state of the opening and closing door 37 described with reference to FIG. 5. Detection information of this sensor is also input to the control unit 201.

In a case where the control unit 201 is, for example, supplied with sensor detection information indicating that the opening and closing door 37 is in an opened state from the door opening and closing sensor 209, the control unit 201 does not perform traveling processing of the mobile device 10. The control unit 201 performs the traveling processing of the mobile device 10 only while sensor detection information indicating a closed state of the opening and closing door 37 is input.

The checkout processing unit (reader-writer or the like) 210, for example, corresponds to the reader-writer 34 described earlier with reference to FIG. 4.

When the IC card of a user is brought into contact with the checkout processing unit 210 at a time of a product purchase by the user, the checkout processing unit 210 communicates with the IC card to perform a checkout for a charge corresponding to the price of a purchased product. Incidentally, checkout information is output to the control unit 201, and is transferred and recorded in the storage unit 212 or the mobile device management server 120.

Incidentally, checkout processing based on received data may be performed on the mobile device management server 120 side.

The communicating unit 211 is, for example, a communicating unit that performs communication with an external device such as the mobile device management server 120, the building management server 130, a user terminal 210 such as a PC, or a smartphone of a user.

Communication data input from the external device is input to the control unit 201, and control according to the communication data is performed.

The storage unit 212 includes a RAM, a ROM, a flash memory, a hard disk, or the like.

The storage unit 212 is used as a recording area for programs executed in the control unit 201, parameters applied to data processing, image data of images for display, and the like.

In addition, map information used to perform traveling processing according to a traveling route is also stored in the storage unit 212.

The input-output unit 213, for example, includes a power button and other units operated by the user, a display unit such as a display, a touch panel type input interface, a microphone as a voice input unit, a speaker as an audio output unit, and the like.

Voice information input via the microphone as the voice input unit, for example, indication information of the user is input to the control unit 201. The control unit 201 performs voice analysis processing, and performs control based on an analysis result.

The driving unit 214 drives the wheels 50 described earlier with reference to FIG. 4. Specifically, the driving unit 214 performs driving such as forward movement, backward movement, left turning, right turning, or rotation of the mobile device 10. Incidentally, the control unit 201 outputs various driving control signals to the driving unit 214, and the driving unit 214 drives the wheels 50 according to the driving control signals.

[8. Example of Hardware Configuration of Other Devices]

Figure 26:
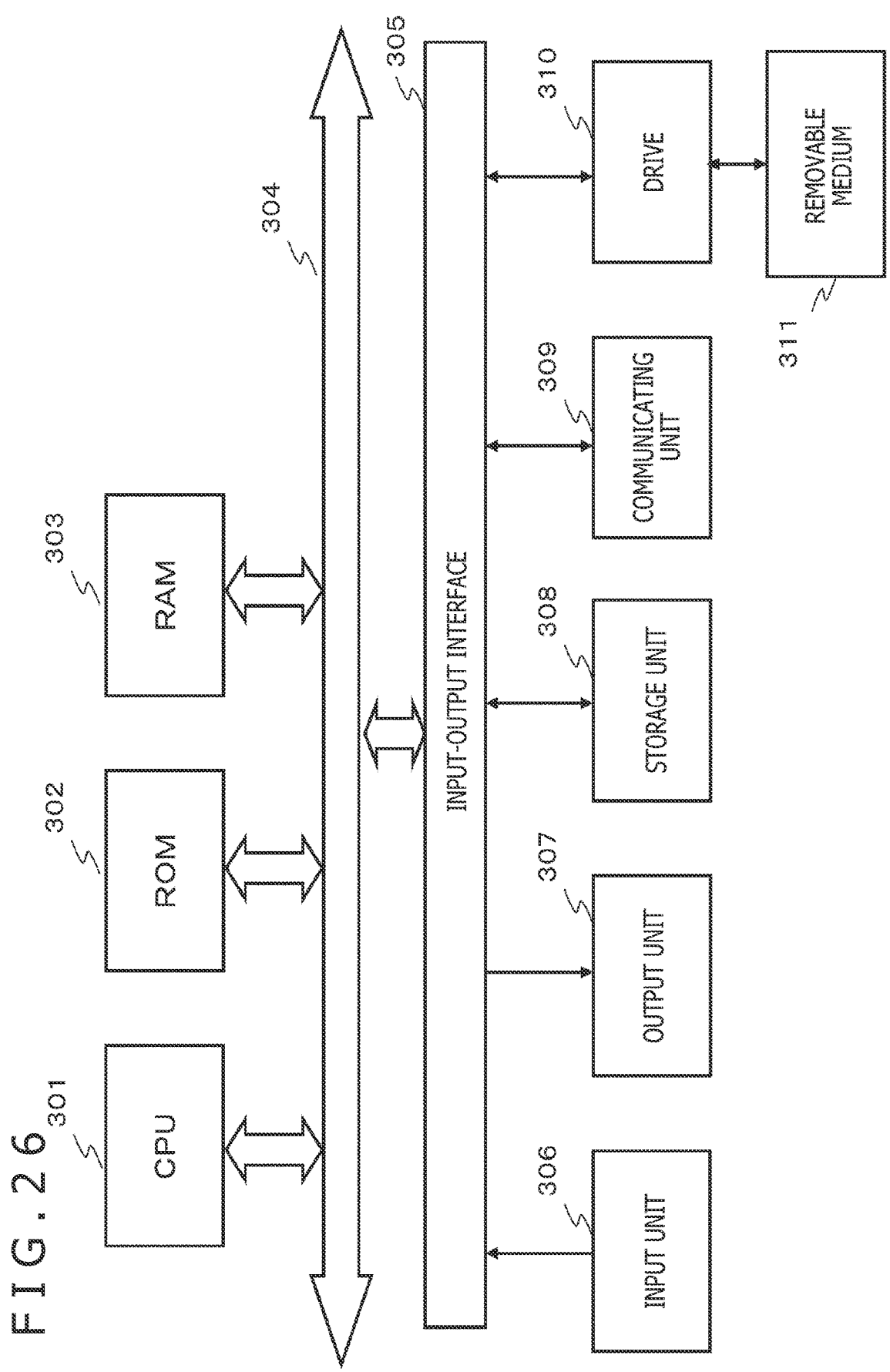
FIG. 26 is a diagram of assistance in explaining an example of hardware configuration of a user terminal, a mobile device management server, and the building management server.

Next, referring to FIG. 26, description will include an example of hardware configuration of a device other than the mobile device 10, that is, a device such as the user terminal 110 such as a PC, or a smartphone of a user, the mobile device management server 120, the building management server 130, or the like.

An information processing device applicable as these devices has a hardware configuration illustrated in FIG. 26, for example.

A CPU (Central Processing Unit) 301 functions as a data processing unit that performs various kinds of processing according to a program stored in a ROM (Read Only Memory) 302 or a storage unit 308. The CPU 301, for example, performs processing according to the sequences described in the foregoing embodiment. A RAM (Random Access Memory) 303 stores a program executed by the CPU 301, data, and the like. The CPU 301, the ROM 302, and the RAM 303 are interconnected by a bus 304.

The CPU 301 is connected to an input-output interface 305 via the bus 304. The input-output interface 305 is connected with an input unit 306 including various kinds of switches, a keyboard, a touch panel, a mouse, a microphone, and the like and an output unit 307 including a display, a speaker, and the like.

The storage unit 308 connected to the input-output interface 305, for example, includes a hard disk or the like. The storage unit 308 stores programs executed by the CPU 301 and various kinds of data. A communicating unit 309 functions as a transmitting and receiving unit for data communication via a network such as the Internet, or a local area network and communicates with an external device.

A drive 310 connected to the input-output interface 305 records or reads data by a driving removable medium 311 such as a magnetic disk, an optical disk, a magneto-optical disk, or a semiconductor memory such as a memory card.

[9. Summary of Configuration According to Present Disclosure]

Embodiments of the present disclosure have been explained above in detail with reference to particular embodiments. However, it is obvious that those skilled in the art can make modifications and substitutions in the embodiments without departing from the gist of the present disclosure. That is, the present invention has been disclosed in a form of illustration and is not to be construed in a limited manner. In order to determine the gist of the present disclosure, the section of claims is to be considered.

Incidentally, the technology disclosed in the present specification can adopt the following configurations.

(1)

A mobile device including:
a control unit configured to perform traveling control of the mobile device, in which
the control unit is configured to
receive input detection information of a sensor mounted on the mobile device,
determine whether or not an object approaching the mobile device is a human on a basis of the input sensor detection information, and
perform control different between a case where the control unit determines that the object is a human and a case where the control unit determines that the object is not a human.

(2)

The mobile device according to (1), in which
the sensor includes a camera, and
the control unit determines whether or not the object approaching the mobile device is a human on a basis of a photographed image of the camera.

(3)

The mobile device according to (1) or (2), in which
in a case where the control unit determines that the object is a human, the control unit performs control of stopping after setting an article mounted in the mobile device in a direction of being visible to the human.

(4)

The mobile device according to any one of (1) to (3), in which
in a case where the control unit determines that the object is a human, the control unit further performs determination processing as to whether or not the human is oriented full face with a face of the human oriented to a mobile device side on the basis of the sensor detection information, and
the control unit performs control different between a case where the human is oriented full face and a case where the human is not oriented full face.

(5)
The mobile device according to (4), in which
in a case where the control unit determines that the human is oriented full face with the face of the human oriented to the mobile device side, the control unit approaches the human to a distance specified in advance, and stops after setting an article mounted in the mobile device in a direction of being visible to the human, and
in a case where the control unit determines that the human is not oriented full face with the face of the human oriented to the mobile device side, the control unit performs control of stopping after setting the article mounted in the mobile device in the direction of being visible to the human at a position separated from the human by a distance specified in advance or more.

(6)
The mobile device according to any one of (1) to (5), in which
in a case where the control unit determines that the object is not a human, the control unit stops or backs the mobile device or changes a traveling direction of the mobile device so as to avoid collision with the object.

(7)
The mobile device according to any one of (1) to (6), in which
according to an allowable noise record map on which an allowable noise level corresponding to a position is recorded, the control unit performs traveling speed control according to a traveling position such that a noise level is equal to or lower than the allowable noise level.

(8)
The mobile device according to (7), in which
the control unit refers to the allowable noise record map retained by an external server and performs the traveling control.

(9)
The mobile device according to (7) or (8), in which
the control unit performs control of changing a traveling speed according to a usage condition of a room in a vicinity of a traveling route.

(10)
The mobile device according to any one of (7) to (9), in which
the control unit performs control of changing a traveling speed according to a kind of traveling surface.

(11)
The mobile device according to (10), in which
the control unit determines the kind of the traveling surface on a basis of an image photographed by a camera and performs the traveling control based on a determination result.

(12)
The mobile device according to any one of (1) to (11), in which
the control unit transmits at least one of a request to use moving means on a traveling route of the mobile device or a request to open and close a door to a building management server that performs processing of managing a building in which the mobile device travels.

(13)
The mobile device according to (12), in which
the control unit transmits a request to use an elevator on the traveling route of the mobile device to the building management server and receives identification information of the elevator to be used from the building management server.

(14)
The mobile device according to (12) or (13), in which
the control unit transmits a request to pass through a security door on the traveling route of the mobile device to the building management server and performs traveling control of passing through the security door opened by the building management server.

(15)
A mobile device control system including:
a mobile device;
and a building management server, in which
the building management server retains an allowable noise record map on which an allowable noise level corresponding to a position is recorded, and
the mobile device performs traveling speed control according to a traveling position such that a noise level is equal to or lower than the allowable noise level according to the allowable noise record map.

(16)
The mobile device control system according to (15), in which
the mobile device transmits at least one of a request to use an elevator on a traveling route of the mobile device or a request to open and close a security door to the building management server, and
in response to request reception from the mobile device, the building management server performs processing for enabling usage of the elevator or passage through the security door.

(17)
A mobile device control method performed in a mobile device, the method including:
by a control unit of the mobile device,
receiving input detection information of a sensor mounted on the mobile device;
determining whether or not an object approaching the mobile device is a human on a basis of the input sensor detection information; and
performing control different between a case where the control unit determines that the object is a human and a case where the control unit determines that the object is not a human.

(18)
A mobile device control method performed in a mobile device control system including a mobile device and a building management server, the method including:
by the building management server,
retaining an allowable noise record map on which an allowable noise level corresponding to a position is recorded; and
by the mobile device,
performing traveling speed control according to a traveling position such that a noise level is equal to or lower than the allowable noise level according to the allowable noise record map.

(19)
A program for making mobile device control processing performed in a mobile device, the program making a control unit of the mobile device:
receive input detection information of a sensor mounted on the mobile device;

determine whether or not an object approaching the mobile device is a human on a basis of the input sensor detection information; and perform control different between a case where the control unit determines that the object is a human and a case where the control unit determines that the object is not a human.

Incidentally, a series of processing described in the specification can be performed by hardware, software, or a composite configuration of hardware and software. In a case where the processing is performed by software, the processing can be performed after a program in which a processing sequence is recorded is installed in a memory within a computer incorporated in dedicated hardware, or the processing can be performed after the program is installed in a general-purpose computer capable of performing various kinds of processing. For example, the program can be recorded on a recording medium in advance. In addition to being installed from a recording medium to a computer, the program can be received via a network such as a LAN (Local Area Network), or the Internet, and installed on a recording medium such as a built-in hard disk.

In addition, the various kinds of processing described in the specification may be not only performed in time series according to the description but also performed in parallel or individually according to the processing power of a device performing the processing or as required. In addition, a system in the present specification is a logical set configuration of a plurality of devices and is not limited to a system in which the devices of respective configurations are located within a same casing.

INDUSTRIAL APPLICABILITY

As described above, according to a configuration of one embodiment of the present disclosure, a mobile device is realized which performs processing different according to whether or not an object approaching the mobile device is a human.

Specifically, for example, the mobile device includes a control unit configured to perform traveling control of the mobile device. The control unit receives input detection information of a sensor mounted on the mobile device, determines whether or not an object approaching the mobile device is a human on the basis of the input sensor detection information, and performs control different between a case where the control unit determines that the object is a human and a case where the control unit determines that the object is not a human. In the case where the control unit determines that the object is a human, the mobile device stops after setting an article mounted in the mobile device in a direction of being visible to the human. In the case where the control unit determines that the object is not a human, the control unit stops or backs the mobile device or changes a traveling direction of the mobile device so as to avoid collision with the object.

According to this configuration, a mobile device is realized which performs processing different according to whether or not an object approaching the mobile device is a human.

REFERENCE SIGNS LIST

10: Mobile device
11: Human (user)
12: Chair
13: Desk
21: Ambient sensor
22: Front sensor
23: Foot sensor
30: Upper unit
31: Turn signal
32: Start button
33: Stop button
34: IC card compatible reader-writer
35: Coin insertion unit
36: Product housing unit
37: Opening and closing door
40: Lower unit
41: State identifying light output unit
52: Microphone
110: User terminal
120: Mobile device management server
130: Building management server
200: Data processing unit
201: Control unit
202: Start button
203: Stop button
204: Turn signal
206: Ambient sensor
207: Front sensor
208: Foot sensor
209: Door opening and closing sensor
210: Checkout processing unit (reader-writer or the like)
211: Communicating unit
212: Storage unit
213: Input-output unit
214: Driving unit
220: Power supply unit
221: Battery
222: Transformer (DC-to-DC converter)
223: AC-to-DC converter
224: AC power supply
301: CPU
302: ROM
303: RAM
304: Bus
305: Input-output interface
306: Input unit
307: Output unit
308: Storage unit
309: Communicating unit
310: Drive
311: Removable medium

The invention claimed is:

1. A mobile device comprising:
a controller configured to perform traveling control of the mobile device, wherein
the controller is configured to
receive input detection information of a sensor mounted on the mobile device,
determine whether or not an object approaching the mobile device is a human on a basis of the input detection information, and
perform control different between a case where the controller determines that the object is a human and a case where the controller determines that the object is not a human,
wherein, when the controller determines that the object is a human, the controller determines whether the human is oriented full face to the mobile device based on the input detection information,
when the controller determines that the human is oriented full face to the mobile device, the controller controls the mobile device to approach the human to a first predetermined distance and stop after setting an article mounted in the mobile device in a direction visible to the human, and when the controller determines that the human is not oriented full face to the mobile device, the controller controls the mobile device to stop after setting the article mounted in the mobile device in the direction visible to the human at a position separated from the human by a second distance that is greater than the first predetermined distance.

2. The mobile device according to claim 1, wherein the sensor includes a camera, and
the controller determines whether or not the object approaching the mobile device is a human on a basis of a photographed image of the camera.

3. The mobile device according to claim 1, wherein in a case where the controller determines that the object is a human, the controller performs control of stopping after setting an article mounted in the mobile device in a direction of being visible to the human.

4. The mobile device according to claim 1, wherein in a case where the controller determines that the object is not a human, the controller stops or backs the mobile device or changes a traveling direction of the mobile device so as to avoid collision with the object.

5. The mobile device according to claim 1, wherein according to an allowable noise record map on which an allowable noise level corresponding to a position is recorded, the controller performs traveling speed control according to a traveling position such that a noise level is equal to or lower than the allowable noise level.

6. The mobile device according to claim 5, wherein the controller refers to the allowable noise record map retained by an external server and performs the traveling control.

7. The mobile device according to claim 5, wherein the controller performs control of changing a traveling speed according to a usage condition of a room in a vicinity of a traveling route.

8. The mobile device according to claim 5, wherein the controller performs control of changing a traveling speed according to a kind of traveling surface.

9. The mobile device according to claim 8, wherein the controller determines the kind of the traveling surface on a basis of an image photographed by a camera and performs the traveling control based on a determination result.

10. The mobile device according to claim 1, wherein the controller transmits at least one of a request to use moving means on a traveling route of the mobile device or a request to open and close a door to a building management server that performs processing of managing a building in which the mobile device travels.

11. The mobile device according to claim 10, wherein the controller transmits a request to use an elevator on the traveling route of the mobile device to the building management server and receives identification information of the elevator to be used from the building management server.

12. The mobile device according to claim 10, wherein the controller transmits a request to pass through a security door on the traveling route of the mobile device to the building management server and performs traveling control of passing through the security door opened by the building management server.

13. A mobile device control system comprising:
a mobile device; and
a building management server, wherein
the building management server retains an allowable noise record map on which an allowable noise level corresponding to a position is recorded,
the mobile device performs traveling speed control according to a traveling position such that a noise level is equal to or lower than the allowable noise level according to the allowable noise record map, and
the mobile device performs control of changing a traveling speed at least according to a type of manufactured material of a traveling surface.

14. The mobile device control system according to claim 13, wherein
the mobile device transmits at least one of a request to use an elevator on a traveling route of the mobile device or a request to open and close a security door to the building management server, and
in response to request reception from the mobile device, the building management server performs processing for enabling usage of the elevator or passage through the security door.

15. A mobile device control method performed in a mobile device, the method comprising:
by a controller of the mobile device,
receiving input detection information of a sensor mounted on the mobile device;
determining whether or not an object approaching the mobile device is a human on a basis of the input detection information; and
performing control different between a case where the controller determines that the object is a human and a case where the controller determines that the object is not a human,
wherein, in response to determining that the object is a human, determining whether the human is oriented full face to the mobile device based on the input detection information,
in response to determining that the human is oriented full face to the mobile device, controlling the mobile device to approach the human to a first predetermined distance and stop after setting an article mounted in the mobile device in a direction visible to the human, and
in response to determining that the human is not oriented full face to the mobile device, controlling the mobile device to stop after setting the article mounted in the mobile device in the direction visible to the human at a position separated from the human by a second distance that is greater than the first predetermined distance.

16. A mobile device control method performed in a mobile device control system including a mobile device and a building management server, the method comprising:
by the building management server,
retaining an allowable noise record map on which an allowable noise level corresponding to a position is recorded; and
by the mobile device,
performing traveling speed control according to a traveling position such that a noise level is equal to or lower than the allowable noise level according to the allowable noise record map, and
performing control of changing a traveling speed at least according to a type of manufactured material of a traveling surface.

17. A non-transitory computer readable medium storing a program for making mobile device control processing performed in a mobile device, the program making a controller of the mobile device:
- receive input detection information of a sensor mounted on the mobile device;
- determine whether or not an object approaching the mobile device is a human on a basis of the input detection information; and
- perform control different between a case where the controller determines that the object is a human and a case where the controller determines that the object is not a human,
- wherein, when the controller determines that the object is a human, the controller determines whether the human is oriented full face to the mobile device based on the input detection information,
- when the controller determines that the human is oriented full face to the mobile device, the controller controls the mobile device to approach the human to a first predetermined distance and stop after setting an article mounted in the mobile device in a direction visible to the human, and
- when the controller determines that the human is not oriented full face to the mobile device, the controller controls the mobile device to stop after setting the article mounted in the mobile device in the direction visible to the human at a position separated from the human by a second distance that is greater than the first predetermined distance.

* * * * *